US012651437B2

(12) United States Patent
Tsuji

(10) Patent No.: US 12,651,437 B2
(45) Date of Patent: Jun. 9, 2026

(54) IMAGE CAPTURING SYSTEM, IMAGE CAPTURING DEVICE, INFORMATION PROCESSING SERVER, IMAGE CAPTURING METHOD, INFORMATION PROCESSING METHOD, AND COMPUTER PROGRAM

(71) Applicant: CANON KABUSHIKI KAISHA, Tokyo (JP)

(72) Inventor: Ryosuke Tsuji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 18/785,143

(22) Filed: Jul. 26, 2024

(65) Prior Publication Data

US 2024/0386706 A1     Nov. 21, 2024

Related U.S. Application Data

(63) Continuation of application No. PCT/JP2023/001647, filed on Jan. 20, 2023.

(30) Foreign Application Priority Data

Jan. 28, 2022     (JP) ................................. 2022-012054

(51) Int. Cl.
*G06V 10/772*          (2022.01)
*G06Q 20/02*          (2012.01)
(Continued)

(52) U.S. Cl.
CPC ........... *G06V 10/772* (2022.01); *G06Q 20/02* (2013.01); *G06V 10/778* (2022.01); *G06V 10/82* (2022.01); *G06V 10/95* (2022.01); *H04N 23/61* (2023.01)

(58) Field of Classification Search
CPC ........ G06Q 20/02; G06T 7/00; G06V 10/772; G06V 10/778; G06V 10/82; G06V 10/95;
(Continued)

(56) References Cited

U.S. PATENT DOCUMENTS

| 11,334,768 B1 * | 5/2022 | Brody ................. G06F 16/9038 |
| 2018/0089531 A1 * | 3/2018 | Geva ........................ G06F 3/015 |

(Continued)

FOREIGN PATENT DOCUMENTS

| JP | 2011090410 A | 5/2011 |
| JP | 2011090413 A | 5/2011 |

(Continued)

OTHER PUBLICATIONS

Ishino, J., "Mobile Service Frontline, New iPhone, Evolution of Machine Learning," Telecommunication, Nov. 2018, vol. 35, No. 11.

*Primary Examiner* — Amy R Hsu
(74) *Attorney, Agent, or Firm* — Canon U.S.A., Inc., IP Division

(57)     ABSTRACT

An image capturing system configured to perform subject detection based on a neural network includes a teacher data input means, a network structure specification means, a dictionary generation means, and an image capturing device. The teacher data input means is configured to input teacher data for the subject detection. The network structure specification means is configured to specify a constraint on the network structure for the subject detection. The dictionary generation means is configured to generate dictionary data for the subject detection based on the teacher data and the constraint on the network structure. The image capturing device is configured to perform the subject detection based on the dictionary data generated by the dictionary generation means and perform predetermined image capturing control on a subject detected by performing the subject detection. The dictionary data includes, as header information, information regarding a count of teacher data used to generate the dictionary data.

31 Claims, 21 Drawing Sheets

(51) Int. Cl.
    *G06V 10/778*     (2022.01)
    *G06V 10/82*     (2022.01)
    *G06V 10/94*     (2022.01)
    *H04N 23/61*     (2023.01)

(58) Field of Classification Search
    CPC ...... H04N 23/61; H04N 23/617; H04N 23/63;
                   H04N 23/67; H04N 23/70
    See application file for complete search history.

(56) References Cited

U.S. PATENT DOCUMENTS

| | | | |
|---|---|---|---|
| 2021/0182077 A1* | 6/2021 | Chen | G06F 9/445 |
| 2022/0121884 A1* | 4/2022 | Zadeh | G06N 3/006 |
| 2024/0212305 A1* | 6/2024 | Tsuji | H04N 23/60 |

FOREIGN PATENT DOCUMENTS

| | | | |
|---|---|---|---|
| JP | 2021043881 A | 3/2021 | |
| JP | 202177377 A | 5/2021 | |
| JP | 6914562 B1 | 8/2021 | |
| JP | 2022015114 A | 1/2022 | |

* cited by examiner

| CONSTRAINTS | | | IMAGE CAPTURING DEVICE A | IMAGE CAPTURING DEVICE B |
|---|---|---|---|---|
| INPUT DATA | IMAGE SIZE | | QVGA | VGA |
| | NUMBER OF CHANNELS | | 3 | 3 |
| NETWORK | NUMBER OF PARAMETERS | | n | m |
| | LAYER | conv | ✓ | ✓ |
| | | pool | ✓ | ✓ |
| | | deconv | | ✓ |
| | | residual | | ✓ |
| | ACTIVATION FUNCTION | relu | ✓ | ✓ |
| | | sigmoid | | ✓ |

$(n < m)$

START

S1001a

DETECT SUBJECT FROM
IMAGE OF TEACHER DATA

S1002a

EXTRACT DETECTION RESULT THAT
OVERLAPS REGION OF TEACHER DATA

S1003a

ESTIMATE TYPE OF TEACHER DATA
FROM EXTRACTED DETECTION RESULT

S1004a

SELECT DICTIONARY DATA
FOR SPECIFIED SUBJECT

END

START

S1001b

SET DICTIONARY DATA
OBTAINED BY LEARNING OBJECT
FEATURES AS INITIAL VALUES

S1002b

FINE-TUNE USING TEACHER DATA

END

PLEASE SELECT
TYPE OF CAMERA.

IMAGE CAPTURING
DEVICE A

IMAGE CAPTURING
DEVICE B     ⁓1204

IMAGE CAPTURING
DEVICE C

DICTIONARY GENERATION
WILL START WITH
FOLLOWING SETTINGS.

TEACHER DATA

CAMERA

IMAGE CAPTURING
DEVICE B

1205 ⁓ | Yes |     No

1

IMAGE CAPTURING SYSTEM, IMAGE CAPTURING DEVICE, INFORMATION PROCESSING SERVER, IMAGE CAPTURING METHOD, INFORMATION PROCESSING METHOD, AND COMPUTER PROGRAM

CROSS-REFERENCE TO RELATED APPLICATIONS

This application is a Continuation of International Patent Application No. PCT/JP2023/001647, filed Jan. 20, 2023, which claims the benefit of Japanese Patent Application No. 2022-012054, filed Jan. 28, 2022, both of which are hereby incorporated by reference herein in their entirety.

TECHNICAL FIELD

The present invention relates to an image capturing system, an image capturing device, an information processing server, an image capturing method, an information processing method, and a computer program using a neural network.

BACKGROUND ART

Subject detection is one of the areas of computer vision research that has been extensively studied. Computer vision is a technology that understands images input to a computer and automatically recognizes various characteristics of those images. In computer vision, subject detection is a task of estimating the position and type of a subject present in a natural image. Subject detection has been applied to, for example, autofocusing technology for image capturing devices.

In recent years, image capturing devices have been known that detect subjects using machine learning methods, which are represented by neural networks, for example. Such an image capturing device uses a learned model (dictionary data) corresponding to a specific subject to detect the specific subject and perform image capturing control. Typical types of such specific subjects are people, animals, such as dogs and cats, and vehicles, such as automobiles. These are subjects in high demand for the autofocus function of the image capturing devices.

CITATION LIST

Patent Literature

PTL 1 Japanese Patent Laid-Open No. 2011-90410
PTL 2 Japanese Patent Laid-Open No. 2011-90413
Japanese Patent Laid-Open No. 2011-90410 discloses an image processing device that receives, from a server device, dictionary data for subject recognition present at a predetermined location. Although the dictionary data is switched depending on the situation, the image processing device does not have a configuration capable of detecting any specific subject desired by the user.

In addition, Japanese Patent Laid-Open No. 2011-90413 discloses an image processing device that realizes, by performing additional learning, a subject detector desirable for the user. Since additional learning is performed, it is difficult to detect any new subjects desired by the user. In addition, circumstances under which learning and inference are performed are assumed in the image processing device, but it may not be possible to perform additional learning appropriately because, for example, there may be a case where image capturing devices or the like have different network structure constraints for subject detection.

SUMMARY OF INVENTION

The present invention aims to provide an image capturing system that can generate any dictionary data desired by the user. In order to solve the above-mentioned problems, the present invention provides an image capturing system configured to perform subject detection based on a neural network, the image capturing system including a teacher data input means configured to input teacher data for the subject detection, a network structure specification means configured to specify a constraint on the network structure for the subject detection, a dictionary generation means configured to generate dictionary data for the subject detection based on the teacher data and the constraint on the network structure, and an image capturing device configured to perform the subject detection based on the dictionary data generated by the dictionary generation means and perform predetermined image capturing control on a subject detected by performing the subject detection.

Further features of the present invention will become apparent from the following description of exemplary embodiments with reference to the attached drawings.

BRIEF DESCRIPTION OF DRAWINGS

FIG. 2 is a block diagram illustrating an example of the configuration of an image capturing device 100 according to Example 1.

FIG. 4 is a diagram illustrating an example of constraint conditions in terms of network structure.

DESCRIPTION OF EMBODIMENTS

With reference to the attached drawings, a preferable embodiment of the present invention will be described below using Examples. Note that, in each drawing, identical members or elements are denoted by the same reference numbers, and redundant description will be omitted or simplified.

Examples will be described using examples where digital still cameras are applied as image capturing devices. However, examples of the image capturing devices include digital movie cameras, smartphones with cameras, tablet computers with cameras, network cameras, vehicle-mounted cameras, drone cameras, cameras mounted on robots, and other electronic devices with image capturing functions.

Example 1

In the following, an image capturing system according to Example 1 of the present invention will be described in detail below.

Figure 1:
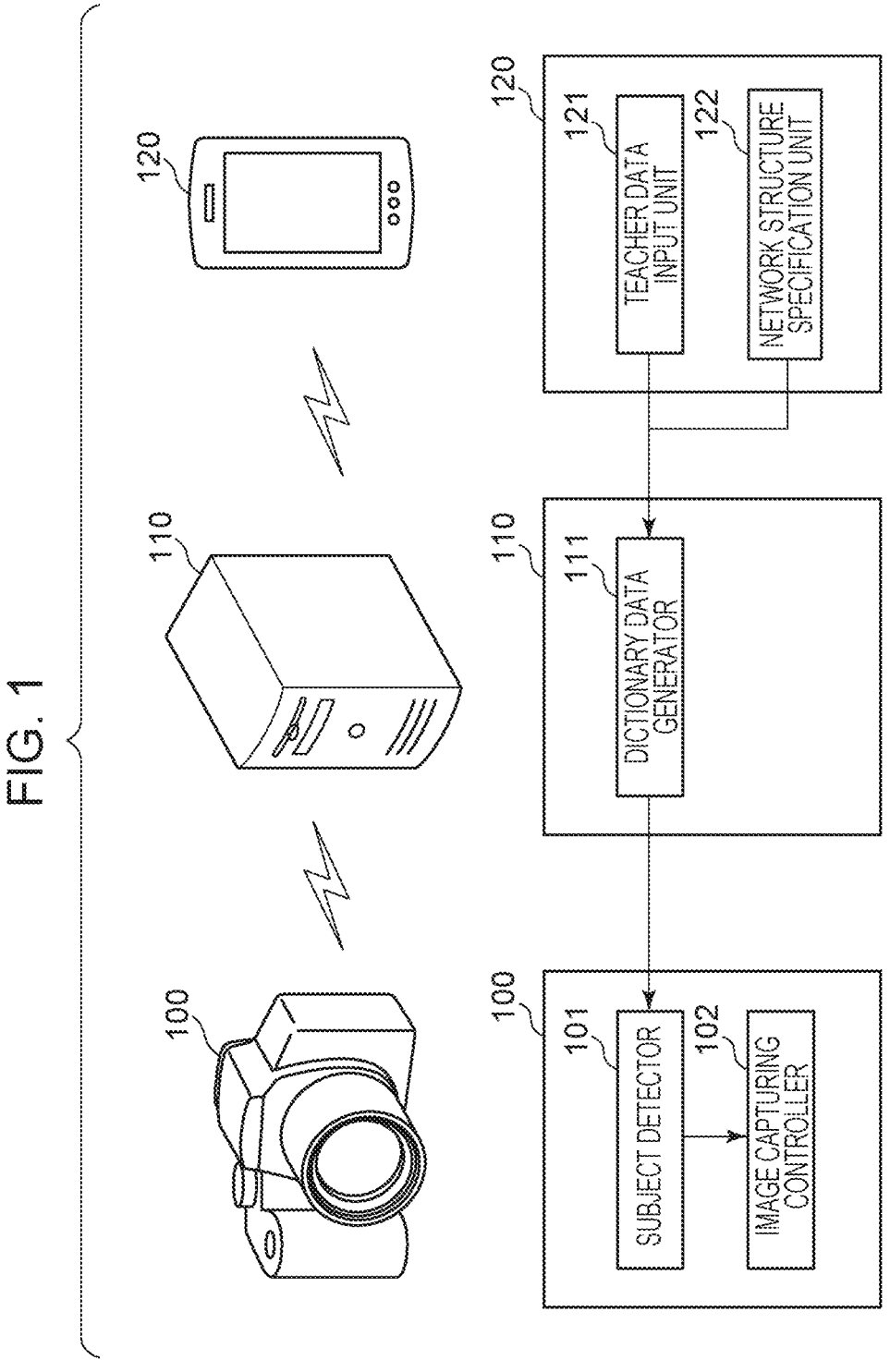
FIG. 1 is a diagram of the configuration of an image capturing system according to Example 1 of the present invention.

FIG. 1 is a diagram of the configuration of the image capturing system according to Example 1 of the present invention. The image capturing system includes an image capturing device 100, a server 110 serving as an information processing server, a mobile terminal 120 serving as an information processing terminal different from the image capturing device 100, and so on. The image capturing device 100 and the server 110 are connected by, for example, a wireless communication network. The server 110 and the mobile terminal 120 are connected by, for example, a wireless communication network.

The functional blocks in the server 110 and mobile terminal 120 illustrated in FIG. 1 are each realized by causing computers included in the server 110 and mobile terminal 120 to execute computer programs stored in memories serving as storage media. This is also true for, for example, FIGS. 13 and 16 below.

The image capturing system according to Example 1 performs subject detection based on a neural network and is also capable of detecting any subjects desired by the user. A typical method for subject detection is called convolutional neural network (hereinafter abbreviated as "CNN"). In CNN, inference processing is performed on the basis of image signals and dictionary data, which are processing parameters and are generated in advance through a learning process based on teacher data.

In the image capturing system according to Example 1, the mobile terminal 120 has a teacher data input unit 121 serving as a teacher data input means configured to input teacher data for subject detection. In addition, the teacher data input unit 121 performs a teacher data input step for inputting teacher data for subject detection.

The teacher data input unit 121 handles, as teacher data, a set of image data and information regarding a subject region of the image data in which a target subject is present. The teacher data input unit 121 can input multiple sets of teacher data and can transmit those multiple sets of teacher data to the server 110.

The server 110 acquires the teacher data transmitted from the mobile terminal 120, and a dictionary data generator 111 generates dictionary data on the basis of the acquired teacher data. The generated dictionary data is transmitted to the image capturing device 100. In Example 1, the dictionary data generator 111 serving as a dictionary generation means is provided in the server 110 serving as an information processing server different from the image capturing device.

The image capturing device 100 receives the dictionary data transmitted from the server 110, and a subject detector 101 performs, on the basis of the received dictionary data, inference processing based on a neural network. Next, based on the inference result, the image capturing controller 102 performs image capturing control, such as autofocus. That is, the image capturing device 100 performs subject detection on the basis of the dictionary data and performs predetermined image capturing control (such as autofocus, exposure control) on a subject detected by performing subject detection.

Different models of image capturing devices 100 may have different network structure constraints for subject detection. In such cases, the dictionary data will differ in accordance with the network structure constraints. Thus, the mobile terminal 120 has a network structure specification unit 122 serving as a network structure specification means. The network structure specification unit 122 specifies, as information regarding a network structure, the constraint conditions of the network structure by specifying, for example, the model name or identification (ID) of the image capturing device, and transmits this information to the server 110.

That is, the network structure specification unit 122 performs a network structure specification step for specifying information regarding a network structure (hereinafter referred to as network-structure-related information).

In the server 110, the dictionary data generator 111 generates dictionary data for subject detection on the basis of the teacher data and the network-structure-related information.

Figure 2:
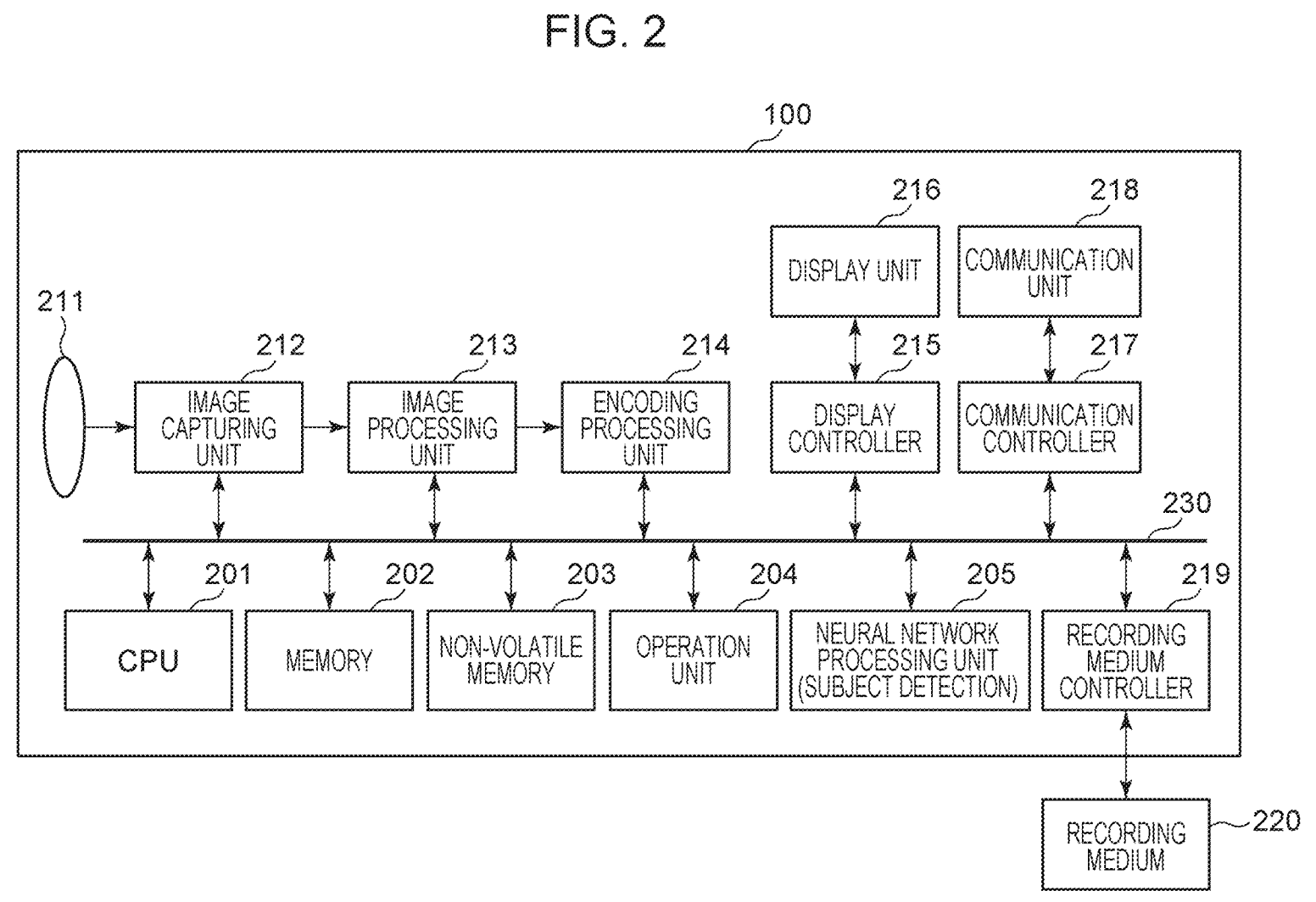

FIG. 2 is a block diagram illustrating an example of the configuration of the image capturing device 100 according to Example 1. As illustrated in FIG. 2, the image capturing device 100 has a central processing unit (CPU) 201, a memory 202, a non-volatile memory 203, an operation unit 204, a neural network processing unit 205, an image capturing unit 212, an image processing unit 213, and an encoding processing unit 214. Furthermore, the image capturing device 100 has a display controller 215, a display unit 216, a communication controller 217, a communication unit 218, a recording medium controller 219, and an internal bus 230.

The image capturing device 100 uses an image capturing lens 211 to form an optical image of a subject on the pixel array of the image capturing unit 212. The image capturing lens 211 may be either nondetachable or detachable from the body (housing, body) of the image capturing device 100. The image capturing device 100 writes and reads out image data to and from the recording medium 220 via the recording medium controller 219. The recording medium 220 may be either nondetachable or detachable from the image capturing device 100.

The CPU 201 executes a computer program stored in the non-volatile memory 203 to control the operation of each unit (each functional block) of the image capturing device 100 via the internal bus 230.

The memory 202 is a rewritable volatile memory. The memory 202 temporarily records, for example, computer programs for controlling the operation of each unit of the image capturing device 100, information regarding parameters and other information related to the operation of each unit of the image capturing device 100, and information received by the communication controller 217. In addition, the memory 202 temporarily records images acquired by the image capturing unit 212, images and information processed by, for example, the image processing unit 213 and encoding processing unit 214. The memory 202 has sufficient storage capacity to record these images and information temporarily.

The non-volatile memory 203 is an electrically erasable-recordable memory. For example, an electrically erasable programmable read-only memory (EEPROM), a hard disk, or the like is used. The non-volatile memory 203 stores, for example, computer programs for controlling the operation of each unit of the image capturing device 100 and information regarding parameters and other information related to the operation of each unit of the image capturing device 100. Such computer programs make it possible to realize the various operations performed by the image capturing device 100. Furthermore, the non-volatile memory 203 stores computer programs describing neural network processing details and learned coefficient parameters, such as a weighting factor and a bias value, to be used by the neural network processing unit 205.

Note that the weighting factor is a value used to indicate the strength of connection between nodes in the neural network, and the bias value is used to provide an offset to the weighted sum of input data obtained using the weighting factor. The non-volatile memory 203 can hold multiple learned coefficient parameters and multiple computer programs describing processing performed by the neural network.

Note that not the non-volatile memory 203 but the memory 202 may temporarily store the computer programs describing processing performed by the neural network and learned coefficient parameters to be used by the neural network processing unit 205 described above. The computer programs describing processing performed by the neural network and the learned coefficient parameters correspond to the dictionary data for subject detection.

The operation unit 204 provides a user interface for operating the image capturing device 100. The operation unit 204 includes various buttons, such as a power button, menu button, release button for image capturing, video recording button, and cancel button. The various buttons are formed by, for example, switches and a touch panel. The CPU 201 controls the image capturing device 100 in accordance with user instructions input via the operation unit 204.

Note that a case where the CPU 201 controls the image capturing device 100 on the basis of operations input via the operation unit 204 has been described as an example but is not limited to this example. For example, the CPU 201 may control the image capturing device 100 on the basis of requests input via the communication unit 218 from a remote controller that is not illustrated or the mobile terminal 120.

The neural network processing unit 205 performs inference processing for the subject detector 101 on the basis of the dictionary data. Details will be described below using FIG. 3.

The image capturing lens (lens unit) 211 includes a lens group including a zoom lens and a focus lens, a lens controller that is not illustrated, and an aperture that is not illustrated. The image capturing lens 211 may function as a zoom means configured to change the angle of view. The lens controller for the image capturing lens 211 controls focus adjustment and an aperture value (f-number) using control signals transmitted from the CPU 201.

The image capturing unit 212 may function as an acquisition means configured to sequentially acquire multiple images, including moving images. For example, a charge-coupled device (CCD) image sensor, a complementary metal-oxide-semiconductor (CMOS) image sensor, or the like is used as the image capturing unit 212. The image capturing unit 212 has a pixel array that is not illustrated. In the pixel array, photoelectric conversion units (pixels) that convert an optical image of a subject into an electrical signal are arranged in a matrix, namely, in two dimensions. The optical image of the subject is formed on the pixel array by the image capturing lens 211. The image capturing unit 212 outputs captured images to the image processing unit 213 and memory 202. Note that the image capturing unit 212 can also acquire still images.

The image processing unit 213 performs predetermined image processing on image data output from the image capturing unit 212 or read out from the memory 202. Examples of such image processing include dynamic range conversion processing, interpolation processing, reduction (resizing) processing, and color conversion processing. The image processing unit 213 also performs predetermined calculation processing for, for example, exposure control and distance measurement control using the image data acquired by the image capturing unit 212.

On the basis of the calculation results obtained through calculation processing performed by the image processing unit 213, the CPU 201 performs, for example, exposure control and distance measurement control. Specifically, the CPU 201 performs, for example, Auto Exposure (AE) processing, Auto White Balance (AWB) processing, and Autofocus (AF) processing. These image capturing controls are performed with reference to the results of subject detection performed by the neural network processing unit 205.

The encoding processing unit 214 compresses the size of the image data from the image processing unit 213 by performing, for example, intra-frame prediction encoding (in-screen prediction encoding) and inter-frame prediction encoding (inter-screen prediction encoding) on the image data.

The display controller 215 controls the display unit 216. The display unit 216 has a display screen that is not illustrated. The display controller 215 generates images that can be displayed on the display screen of the display unit 216 and outputs the images, namely image signals, to the display unit 216. In addition to outputting image data to the display unit 216, the display controller 215 can also output image data to external devices via the communication controller 217. The display unit 216 displays images on the display screen on the basis of the image signals sent from the display controller 215.

The display unit 216 has an On-Screen Display (OSD) function, which is a function for displaying setting screens, such as a menu, on the display screen. The display controller 215 may superimpose an OSD image on the image signals and output the image signals to the display unit 216. The display controller 215 can also generate a subject frame on the basis of the subject detection result from the neural network processing unit 205 and superimpose the subject frame on the image signal. The display unit 216 may display the resulting image. The display unit 216 is constituted by, for example, a liquid crystal display or an organic EL display and displays image signals sent from the display controller 215. The display unit 216 may include, for example, a touch panel. In a case where the display unit 216 includes a touch panel, the display unit 216 may also function as the operation unit 204.

The communication controller 217 is controlled by the CPU 201. The communication controller 217 generates modulation signals that conform to wireless communication standards, such as IEEE 802.11, outputs the modulation signals to the communication unit 218, and also receives modulation signals from external devices via the communication unit 218. In addition, the communication controller 217 can transmit and receive control signals for video signals. For example, the communication controller 217 may control the communication unit 218 to send video signals conforming to communication standards, such as High-Definition Multimedia Interface (HDMI®) or Serial Digital Interface (SDI).

The communication unit 218 converts video and control signals into physical electrical signals. The communication unit 218 transmits the physical electrical signals to external devices and receives physical electrical signals from external devices. Note that the communication unit 218 not only transmits and receives video and control signals but also receives, for example, dictionary data for subject detection in the neural network processing unit 205.

The recording medium controller 219 controls the recording medium 220. On the basis of a request from the CPU 201, the recording medium controller 219 outputs, to the recording medium 220, control signals for controlling the recording medium 220. As the recording medium 220, for example, a non-volatile memory, magnetic disk, or the like is used. The recording medium 220 may be either detachable or nondetachable, as described above. The recording medium 220 stores encoded image data and other data as files in a format compatible with the file system of the recording medium 220.

Each of the functional blocks 201 to 205, 212 to 215, 217, and 219 is accessible to each other via the internal bus 230.

Note that some of the functional blocks illustrated in FIG. 2 are realized by causing the CPU 201, which serves as the computer included in the image capturing device 100, to execute a computer program stored in, for example, the non-volatile memory 203 serving as a storage medium. However, some or all of the functional blocks may be realized using hardware. The hardware can be a dedicated circuit (an application specific integrated circuit (ASIC)) or a processor (a reconfigurable processor, a digital signal processor (DSP)).

Figure 3:
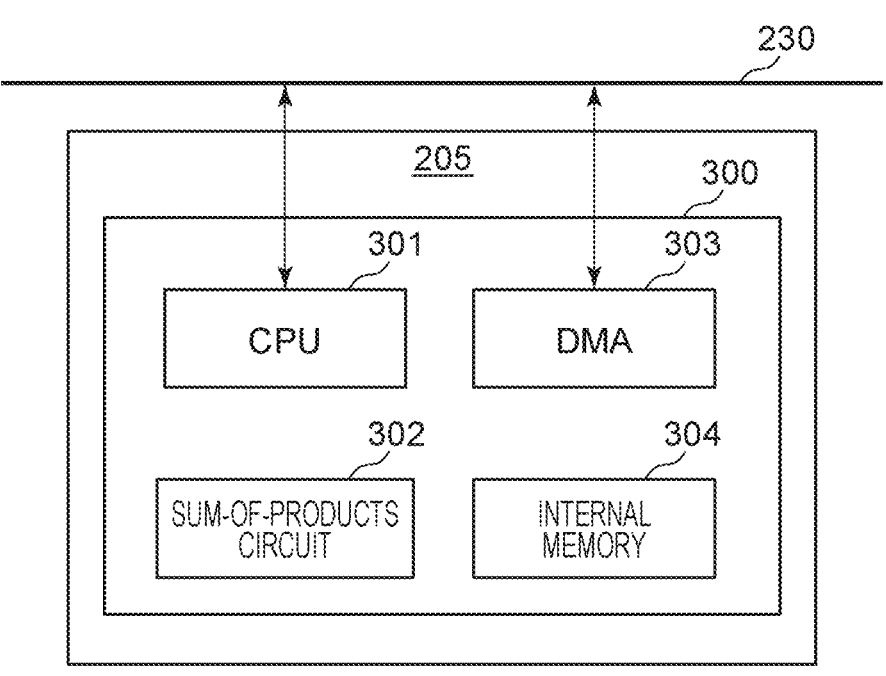
FIG. 3 is a block diagram illustrating a schematic configuration of a neural network processing unit 205 according to Example 1.

FIG. 3 is a block diagram illustrating a schematic configuration of the neural network processing unit 205 according to Example 1.

The neural network processing unit 205 performs neural network processing using coefficient parameters learned in advance. Note that neural network processing is performed by the fully connected layer of CNN, for example, but is not necessarily performed by this. The learned coefficient parameters described above correspond to the weighting factors and bias values that each edge connecting the nodes in each layer has in the fully connected layer, and the weighting factors and bias values for the kernels in CNN.

As illustrated in FIG. 3, the neural network processing unit 205 includes a CPU 301, a sum-of-products circuit 302, a dynamic memory access (DMA) device 303, and an internal memory 304 in a neural core 300.

The CPU 301 acquires a computer program describing neural network processing details from the memory 202 or non-volatile memory 203 via the internal bus 230 or from the internal memory 304, and executes the computer program. The CPU 301 also controls the sum-of-products circuit 302 and the DMA device 303.

The sum-of-products circuit 302 is a circuit that performs sum-of-products operations in a neural network. The sum-of-products circuit 302 has multiple sum-of-products operation units, which can perform sum-of-products operations in parallel. In addition, the sum-of-products circuit 302 outputs, to the internal memory 304 via the DMA device 303, intermediate data calculated during sum-of-products operations performed in parallel by the multiple sum-of-products operation units.

The DMA device 303 is a circuit specialized in data transfer without using the CPU 301 and transfers data between the memory 202 or non-volatile memory 203 and the internal memory 304 via the internal bus 230. The DMA device 303 also transfers data between the sum-of-products circuit 302 and the internal memory 304. The data to be transferred by the DMA device 303 include the computer programs describing the neural network processing details, the learned coefficient parameters, and the intermediate data calculated by the sum-of-products circuit 302.

The internal memory 304 stores the computer programs describing the neural network processing details, the learned coefficient parameters, and the intermediate data calculated by the sum-of-products circuit 302. The internal memory 304 may have multiple banks and may dynamically switch the banks.

The capacity of the internal memory 304 and the calculation specifications of the sum-of-products circuit 302 have constraints, and the neural network performs processing by meeting predetermined constraints. Constraints may be different for different models of image capturing devices, and different constraint conditions need different computer programs and different learned coefficient parameters. In other words, the dictionary data for subject detection are different from each other.

FIG. 4 is a diagram illustrating an example of constraint conditions in terms of network structure.

FIG. 4 illustrates network-structure-related information. The table includes columns indicating model names listed horizontally and rows indicating, for example, network structure constraints listed vertically. The image size of input data, the number of input data channels (hereinafter also referred to as the channel count of the input data), and the number of network parameters (hereinafter also referred to as the network parameter count) are constraints that depend on the capacity of the internal memory 304. An image capturing device A has less memory capacity than an image capturing device B, and thus the image capturing device A is more constrained.

The types of layers and the types of activation functions are constraints on the calculation specifications of the sum-of-products circuit 302, and the image capturing device A has fewer types of operations that can be expressed than the image capturing device B, and thus the image capturing device A is more constrained. That is, the network-structure-related information includes information regarding at least one of the image size of input data, the number of input data channels, the number of network parameters, memory capacity, a layer type, an activation function type, and sum-of-products specifications.

Figure 5:
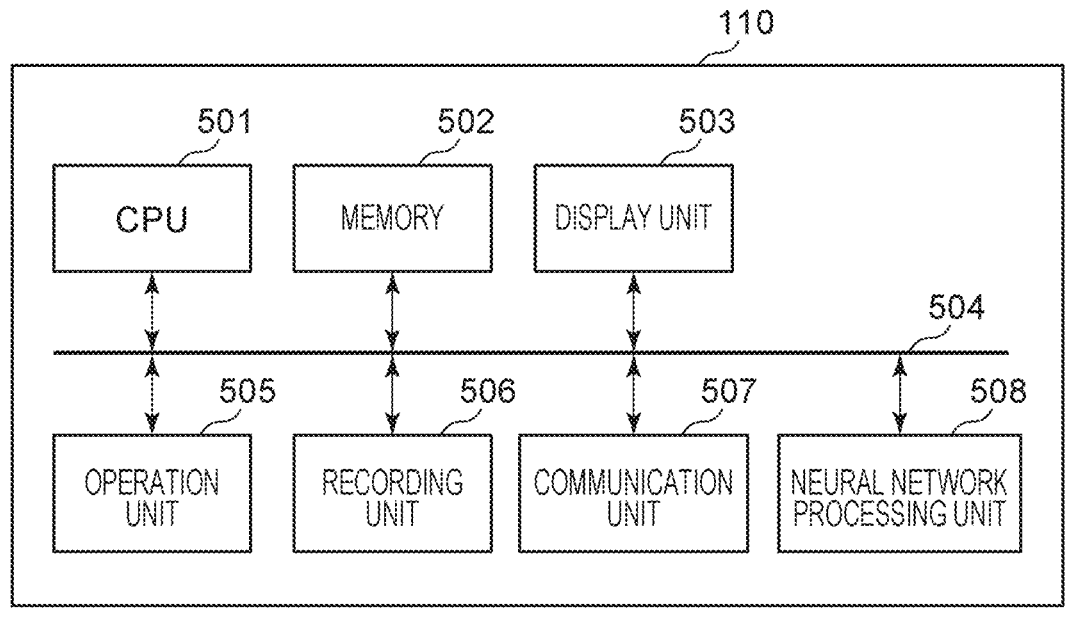
FIG. 5 is a block diagram illustrating an example of a hardware configuration of a server 110.

FIG. 5 is a block diagram illustrating an example of a hardware configuration of the server 110.

As illustrated in FIG. 5, the server 110 has a CPU 501, a memory 502, a display unit 503, an operation unit 505, a recording unit 506, a communication unit 507, and a neural network processing unit 508.

Note that some of the functional blocks illustrated in FIG. 5 are realized by causing the CPU 501, which serves as the computer illustrated in the server 110, to execute a computer program stored in, for example, the recording unit 506 serving as a storage medium. However, some or all of the functional blocks may be realized using hardware. The hardware can be a dedicated circuit (an ASIC) or a processor (a reconfigurable processor, a DSP).

The CPU 501 controls all processing blocks that constitute the server 110 by executing computer programs stored in the recording unit 506.

The memory 502 is a memory mainly used as a work area for the CPU 501 and a temporary buffer area for data.

The display unit 503 includes, for example, an LCD panel or an organic EL panel, and displays, for example, operation screens on the basis of instructions from the CPU 501.

The internal bus 504 is a bus for interconnecting each processing block in the server 110.

The operation unit 505 includes, for example, a keyboard, a mouse, buttons, a touch panel, or a remote controller and accepts operation instructions from the user. The operation information input from the operation unit 505 is transmitted to the CPU 501, and the CPU 501 controls each processing block on the basis of the operation information.

The recording unit 506 includes a recording medium and is a processing block that stores and reads out various data in and from the recording medium on the basis of instructions from the CPU 501. The recording medium includes, for example, an EEPROM, an internal flash memory, an internal hard disk, or a detachable memory card. The recording unit 506 stores the input data and teacher data and dictionary data, which are data for learning in the neural network processing unit 508, in addition to the computer programs.

The communication unit 507 includes hardware and other components for wireless and wired LAN communication. In wireless LAN communication, processing based on, for example, the IEEE 802.11n/a/g/b system is performed. The communication unit 507 connects to an external access point via a wireless LAN and performs wireless LAN communication with other wireless communication devices via the access point. In addition, the communication unit 507 performs communication via an external router or switching hub using an Ethernet cable or other means in a wired LAN. The communication unit 507 communicates with external devices, including the image capturing device 100, and exchanges information, such as teacher data and dictionary data.

The neural network processing unit 508 selects a neural network model on the basis of the teacher data obtained via the communication unit 507 and the network structure constraint information acquired via the communication unit 507, and performs neural network learning processing. The neural network processing unit 508 corresponds to the dictionary data generator 111 illustrated in FIG. 1 and performs, using the teacher data, learning processing to construct dictionary data corresponding to each of the different classes of subjects.

The neural network processing unit 508 includes, for example, a graphic processing unit (GPU) or a digital signal processor (DSP). The dictionary data, which is the result of the learning processing performed by the neural network processing unit 508, is stored in the recording unit 506.

Figure 6:
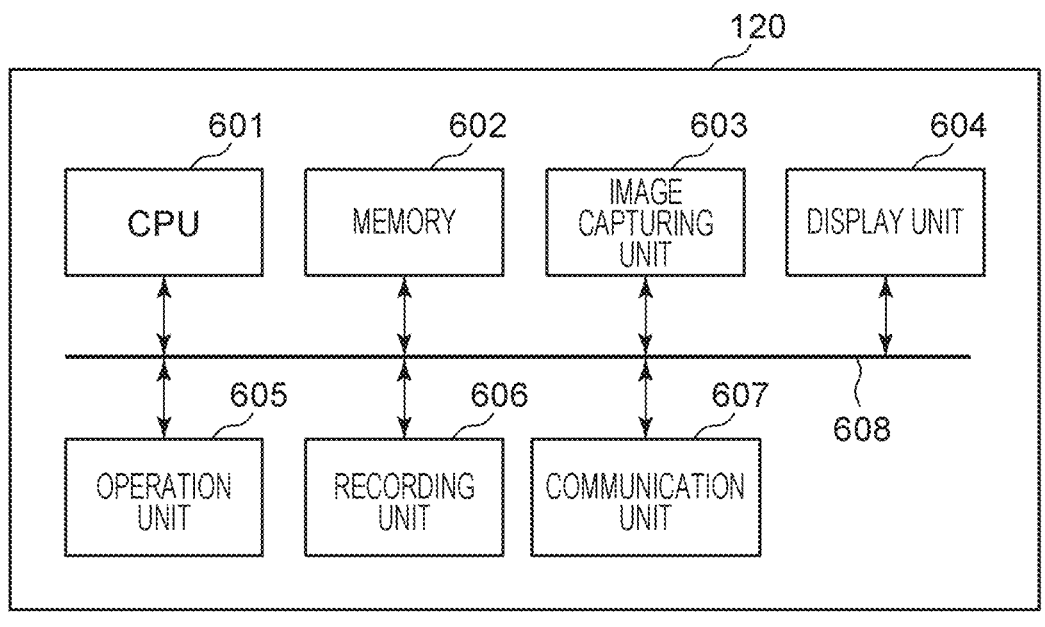
FIG. 6 is a block diagram illustrating an example of a hardware configuration of a mobile terminal 120.

FIG. 6 is a block diagram illustrating an example of a hardware configuration of the mobile terminal 120.

As illustrated in FIG. 6, the mobile terminal 120 has a CPU 601, a memory 602, an image capturing unit 603, a display unit 604, an operation unit 605, a recording unit 606, a communication unit 607, and an internal bus 608. Some of the functional blocks illustrated in FIG. 6 are realized by causing the CPU 601, which serves as the computer included in the mobile terminal 120, to execute a computer program stored in, for example, the recording unit 606 serving as a storage medium. However, some or all of the functional blocks may be realized using hardware. The hardware can be a dedicated circuit (an ASIC) or a processor (a reconfigurable processor, a DSP).

The CPU 601 controls all processing blocks that constitute the mobile terminal 120 by executing computer programs stored in the recording unit 606.

The memory 602 is a memory mainly used as a work area for the CPU 601 and a temporary buffer area for data. Programs, such as an operating system (OS) and application software programs, are loaded into the memory 602 and executed by the CPU 601.

The image capturing unit 603 includes, for example, an optical lens, a CMOS sensor, and a digital image processing unit. The image capturing unit 603 captures an optical image input through the optical lens and converts the optical image into digital data to acquire captured image data. The captured image data acquired by the image capturing unit 603 is temporarily stored in the memory 602 and processed under control performed by the CPU 601. For example, the captured image data is recorded on a recording medium by the recording unit 606 or transmitted to an external device by the communication unit 607. The image capturing unit 603 also includes a lens controller and controls, for example, zoom, focus, and aperture adjustment on the basis of commands from the CPU 601.

The display unit 604 includes, for example, an LCD panel or an organic EL panel, and performs display on the basis of instructions from the CPU 601. Images of teacher data are selected from among the captured images, and the operation screens and the captured images, for example, are also displayed to perform network structure specification.

The operation unit 605 includes, for example, a keyboard, a mouse, buttons, a directional pad, a touch panel, or a remote controller and accepts operation instructions from the user. The operation information input from the operation unit 605 is transmitted to the CPU 601, and the CPU 601 controls each processing block on the basis of the operation information.

The recording unit 606 includes a large-capacity recording medium and is a processing block that stores and reads out various data in and from the recording medium on the basis of instructions from the CPU 601. The recording medium includes, for example, an internal flash memory, an internal hard disk, or a detachable memory card.

The communication unit 607 includes antennas and hardware processing devices for wireless LAN, wired LAN, and other communications and performs wireless LAN communication based on, for example, the IEEE 802.11n/a/g/b system. The communication unit 607 connects to an external access point via a wireless LAN and performs wireless LAN communication with other wireless communication devices via the access point. The communication unit 607 transmits, to the server 110, the teacher data input via the operation unit 605 from the user and the network structure.

The internal bus 608 is a bus for interconnecting each processing block in the mobile terminal 120.

Figure 7:
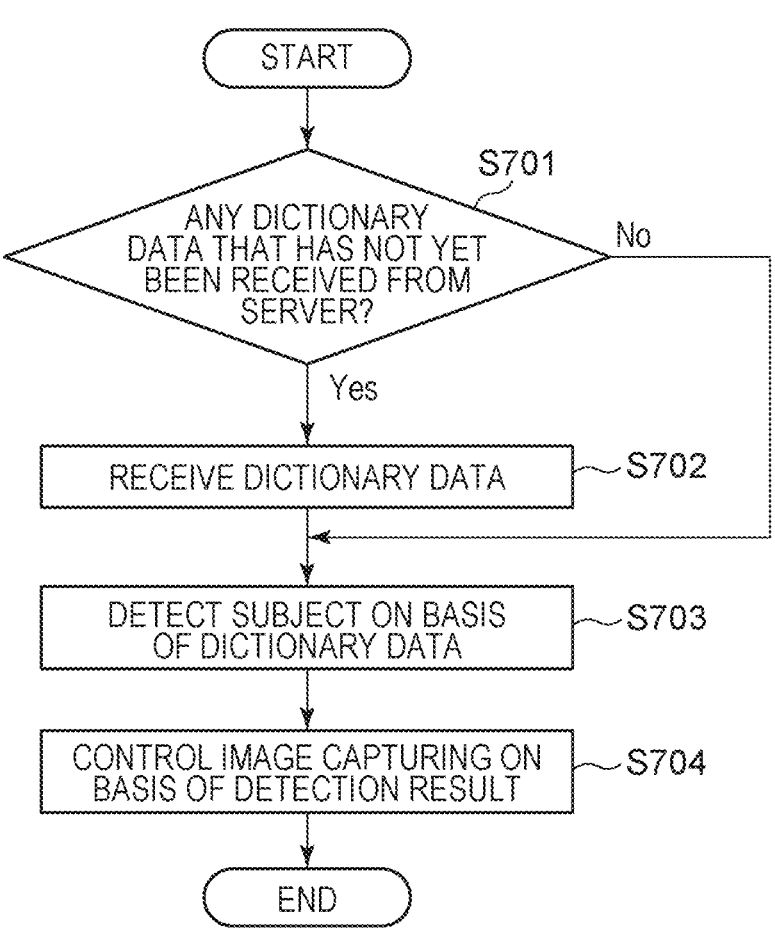
FIG. 7 is a flowchart illustrating processing performed by the image capturing device according to Example 1.

FIG. 7 is a flowchart illustrating processing performed by the image capturing device according to Example 1. The procedure of processing performed by the image capturing device 100 in Example 1 will be described using FIG. 7. In the processing, dictionary data to be used in the image capturing device 100 is received, subject detection is performed, and image capturing control is performed. This operation is realized by the CPU 201 reading out and executing a computer program loaded into the memory 202 from the non-volatile memory 203 in a state where the power of the image capturing device 100 is on, the computer program having been stored in the non-volatile memory 203.

In step S701, the image capturing device 100 checks with the server 110 via the communication unit 218 as to whether there is any dictionary data that has not yet been received from the server 110. In a case where there is dictionary data in the server 110 that the image capturing device 100 has not received from the server 110 (a determination of YES in step S701), in step S702, the image capturing device 100 acquires the dictionary data from the server 110 via the communication unit 218 and stores the dictionary data in the non-volatile memory 203. In a case where there is no dictionary data in the server 110 that the image capturing device 100 has not received from the server 110 (a determination of NO in step S701), the process proceeds to Step S703.

In step S703, the neural network processing unit 205 performs subject detection using the dictionary data recorded in the non-volatile memory 203. The dictionary data may be copied from the non-volatile memory 203 to the memory 202 or internal memory 304 of the neural network processing unit 205 and then be used in subject detection. The subject detection in step S703 is performed using, as input data, the image data acquired by the image capturing unit 212.

In step S704, the image capturing unit 212 performs image capturing control, such as autofocus, on the basis of the subject detection result. That is, image capturing control, such as autofocus or exposure control, to ensure proper exposure is performed in addition to focusing on the detected subject. In this case, steps S703 and S704 function as an image capturing step in which subject detection is performed on the basis of the dictionary data and predetermined image capturing control is performed on the subject detected by performing subject detection.

In Example 1, the step of acquiring dictionary data from the server and the subject detection and image capturing control based on the acquired dictionary data are performed in the same procedure. However, the procedure is not limited to this one. For example, there may be a mode or timing for checking with the server to acquire dictionary data in advance when image capturing is not performed. Regarding the dictionary data to be used in subject detection, the dictionary data acquired from the server by checking with the server does not necessarily have to be used as is. For example, as a step for determining dictionary data before using the dictionary data (for example, before step S704), for example, a step for accepting a user operation or a step for automatically determining dictionary data may be provided.

Figure 8A:
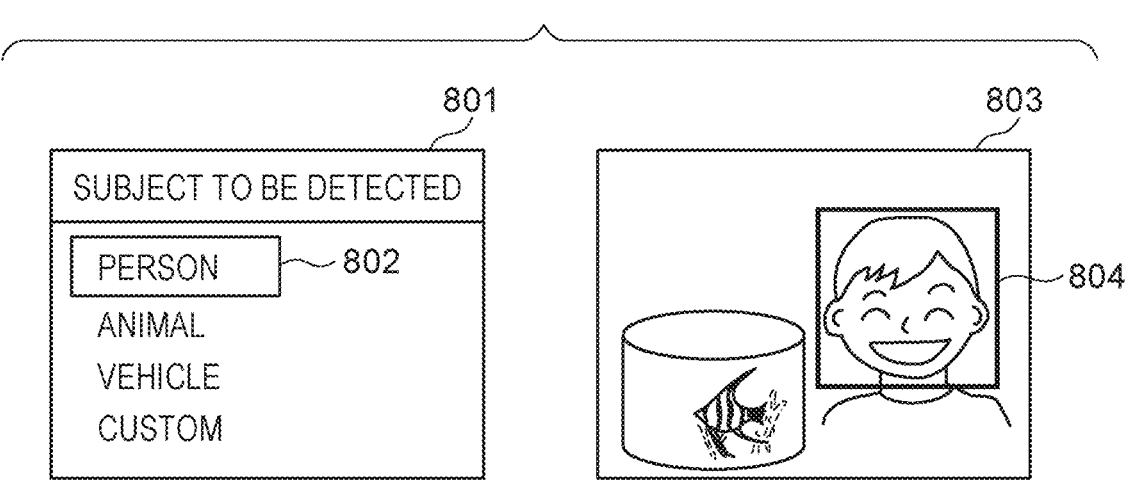
FIG. 8A is a diagram for describing an example of subject detection based on dictionary data.
Figure 8B:
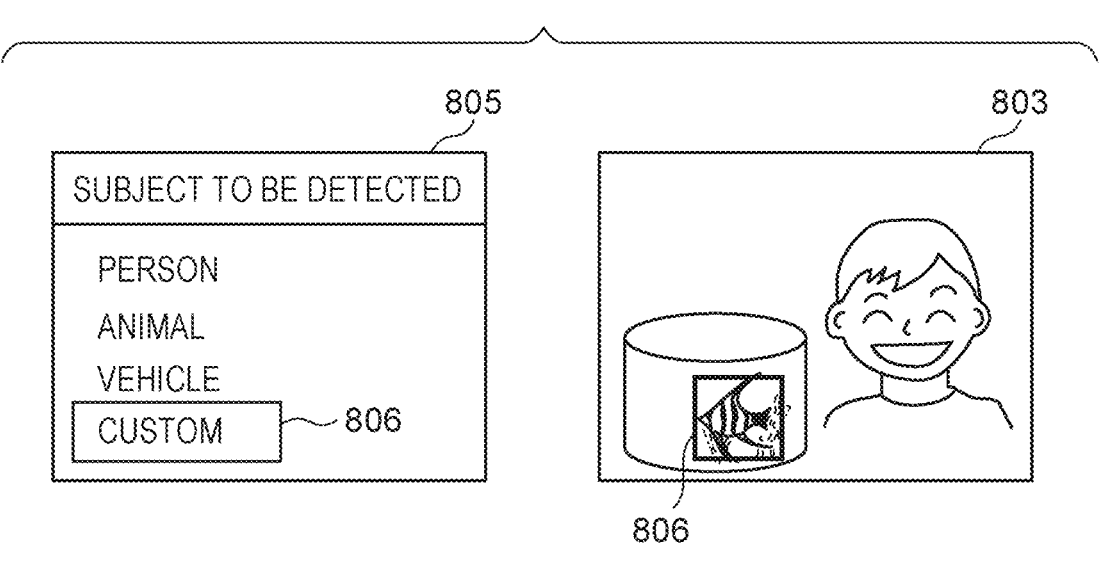
FIG. 8B is a diagram for describing an example of subject detection based on dictionary data.

FIGS. 8A and 8B are diagrams for describing examples of subject detection based on dictionary data.

The dictionary data in Example 1 has, for each subject type, a computer program describing processing details for causing the neural network processing unit 205 to perform a subject detection task, and learned coefficient parameters.

For example, subject types include a person, an animal, and a vehicle. Examples of the animal include dogs and cats, and examples of the vehicle include cars and motorcycles.

In FIGS. 8A and 8B, reference signs 801 and 805 indicate examples of the menu screen on the display unit 216, where the subject to be detected is set by the user via the operation unit 204. In FIG. 8A, "person" 802 is set as the subject to be detected. In a case where "person" is set, subject detection is performed using the dictionary data for "person" stored in the non-volatile memory 203 in advance. A reference sign 803 indicates the captured image displayed on the display unit 216, and the state is illustrated in which a face of a "person" is detected and is displayed with a frame 804 superposed.

In FIG. 8B, "custom" 806 is set as the subject to be detected. In the case of "custom", subject detection is performed using, for example, "fish" as custom dictionary data received from the server 110. The reference sign 803 indicates the captured image displayed on the display unit 216, and the state is illustrated in which the dictionary data for "custom" is "fish" and the detected fish is displayed with a frame 806 superposed.

Figure 9:
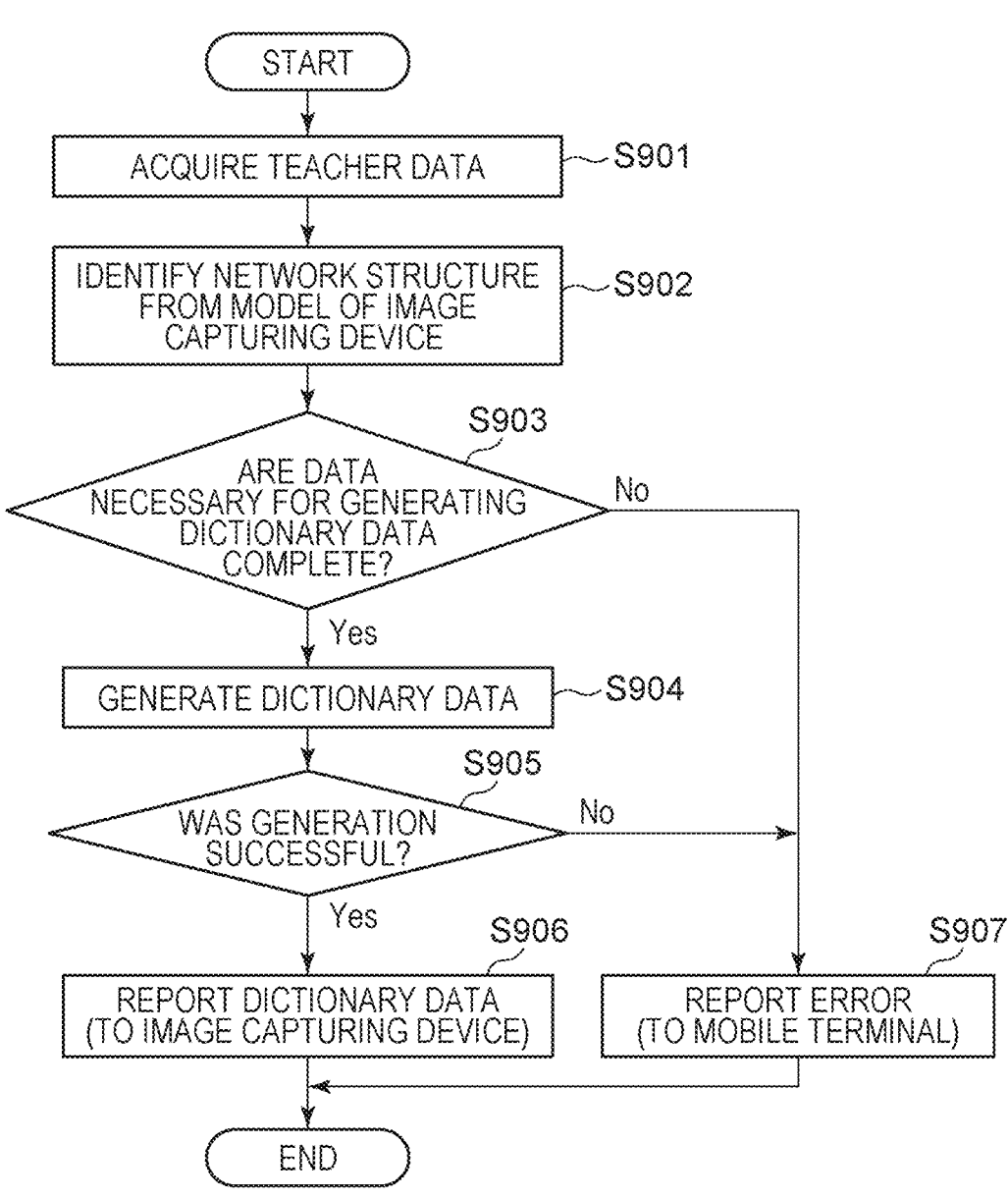
FIG. 9 is a flowchart illustrating processing performed by the server according to Example 1.

FIG. 9 is a flowchart illustrating processing performed by the server according to Example 1.

Note that the processing in FIG. 9 is realized by the CPU 501 reading out and executing a computer program loaded into the memory 502 from the recording unit 506 in a state where the power of the server 110 is on, the computer program having been stored in the recording unit 506.

FIG. 9 is used to describe an excerpt regarding the processing performed by the server 110 in which teacher data and network-structure-related information are acquired from the mobile terminal 120, dictionary data is generated, and the generated dictionary data is transmitted to the image capturing device 100.

In step S901, the server 110 acquires teacher data from the mobile terminal 120 via the communication unit 507. In this case, step S901 functions as a teacher data acquisition means configured to acquire teacher data for subject detection. In step S902, network-structure-related information is also acquired from the mobile terminal 120 via the communication unit 507 to identify the network structure. The network-structure-related information is, for example, the model name of the image capturing device, and suppose that the correspondence between the model name of the image capturing device and the network structure is recorded in the recording unit 506. Step S902 functions as a network structure acquisition means for acquiring network-structure-related information.

Next, in step S903, whether the data necessary for generating dictionary data are complete is checked. In a case where the data are complete (a determination of YES in step S903), the process proceeds to step S904. In a case where the data are incomplete (a determination of NO in step S903), the process proceeds to step S907.

For example, in the case where image data is present in the teacher data but no subject region has been set, a determination of NO is made in step S903.

In step S904, the neural network processing unit 508 generates dictionary data. One method for generating dictionary data (for example, FIG. 10A) is to generate a large number of dictionary data in advance and select appropriate dictionary data from the teacher data. Moreover, a method for generating dictionary data from the teacher data by performing learning (for example, FIG. 10B) is also applicable. Step S904 functions as a dictionary generation means (a dictionary generation step).

Figure 10A:
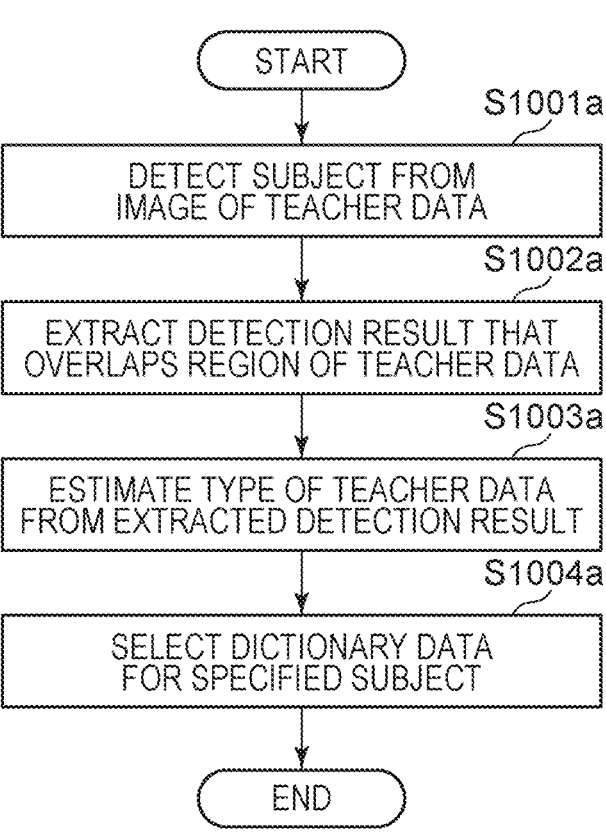
FIG. 10A is a flowchart for describing the procedure of dictionary data generation processing according to Example 1.
Figure 10B:
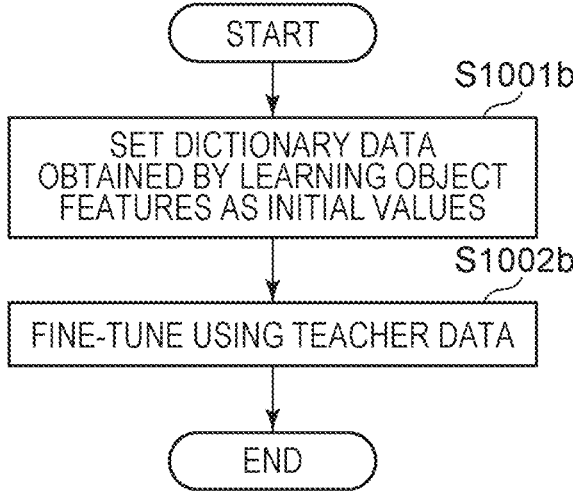
FIG. 10B is a flowchart for describing the procedure of dictionary data generation processing according to Example 1.

FIGS. 10A and 10B are flowcharts for describing the procedures of dictionary data generation processing according to Example 1.

FIG. 10A is a flowchart illustrating the procedure of processing in an example of selection-based dictionary data generation. In step S1001a, a subject is detected from the image data of the teacher data. For subject detection in this case, known subject detection methods, such as YOLO and FastR-CNN, can be applied as those capable of detecting multiple types of subjects.

As detection results, xy-coordinate position information, a size, a detection score, a subject type, and so forth are output. In step S1002a, a detection result that matches a certain region of the teacher data is extracted on the basis of the region information regarding the teacher data and the position information and size out of the subject detection results.

In step S1003a, the type of teacher data is estimated from the extracted detection result. In a case where multiple teacher data are present, the subject type is determined from the average of the scores for respective subject types.

In step S1004a, estimated dictionary data is selected. Multiple dictionary data are prepared in advance for respective types of network structure, and the dictionary data for the target network structure is selected. In this case, step S1004a functions as a dictionary generation means for selecting a dictionary suitable for the subject of the teacher data from the multiple dictionary data prepared in advance.

FIG. 10B is a flowchart illustrating the procedure of processing in an example of learning-based dictionary data generation. In a case where learning is performed from the state where the initial values of dictionary data are random numbers, a large number of teacher data is necessary. When a large number of teacher data is necessary, it is troublesome for the user to input all of such teacher data. Thus, a method that uses a small number of teacher data for learning is desired.

In step S1001b, dictionary data obtained by learning a wide variety of objects in advance is set as the initial values. In step S1002b, learning is performed on the basis of the teacher data. Since the initial values of the dictionary data are not random numbers but learned object features, it is so-called fine-tuning. In this case, step S1002b functions as a dictionary generation means for generating the dictionary data by performing learning based on the teacher data.

The description returns to that of the flowchart in FIG. 9. Once dictionary data generation is performed in step S904, it is determined in step S905 whether or not the dictionary data generation was successful. In a case of a selection-based method as illustrated in FIG. 10A, successful dictionary data generation leads to successful dictionary selection, and unsuccessful dictionary data generation leads to unsuccessful dictionary selection. For example, when no detection results belonging to the teacher data are obtained, dictionary selection becomes unsuccessful. In a case of a learning-based method as illustrated in FIG. 10B, for example, the dictionary data generation is successful when the value of the learning loss function is less than or equal to a predetermined threshold value, and the dictionary data generation is unsuccessful when the value of the learning loss function is greater than the predetermined threshold value.

In a case where the dictionary data generation is successful (a determination of YES in step S905), the dictionary data is transmitted to the image capturing device 100 via the communication unit 507 in step S906. In this case, step S906 functions as a dictionary data transmission means for transmitting the dictionary data generated by the dictionary generation means to the image capturing device 100.

In a case where the dictionary data generation is unsuccessful (a determination of NO in step S905), the mobile terminal 120 is notified of occurrence of an error via the communication unit 507 in step S907.

Figure 11:
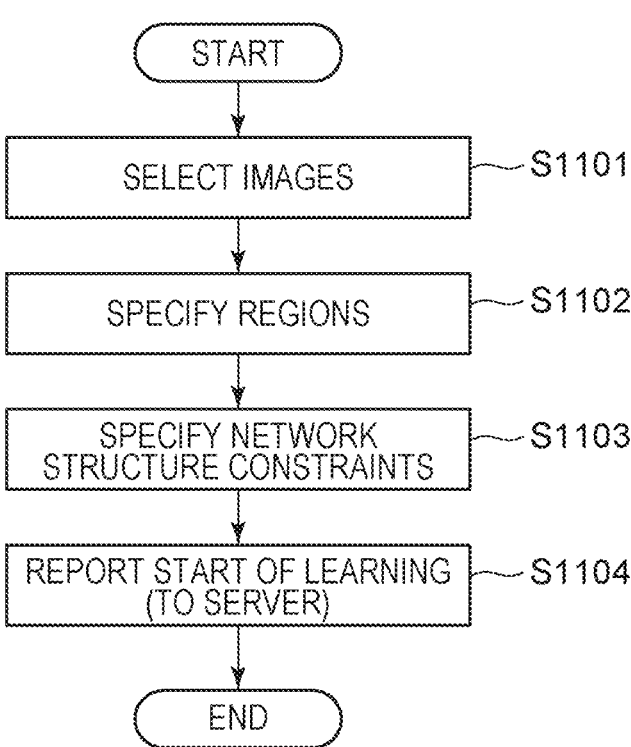
FIG. 11 is a flowchart illustrating an example of the procedure of processing performed by the mobile terminal 120 according to Example 1.

FIG. 11 is a flowchart illustrating an example of the procedure of processing performed by the mobile terminal 120 according to Example 1.

The following is an excerpt regarding processing performed by the mobile terminal 120 to receive the teacher data and network-structure-related information and to notify the server 110 of the start of learning. This operation is realized by the CPU 601 reading out and executing a computer program loaded into the memory 602 from the recording unit 606 in a state where the power of the mobile terminal 120 is on, the computer program having been stored in the recording unit 606.

FIGS. 12A, 12B, 12C, and 12D illustrate the procedure of processing in the flowchart in FIG. 11.

FIGS. 12A, 12B, 12C, and 12D are diagrams for describing examples of input screens for the teacher data and network structure on the display unit 604 of the mobile terminal according to Example 1.

Figure 12A:
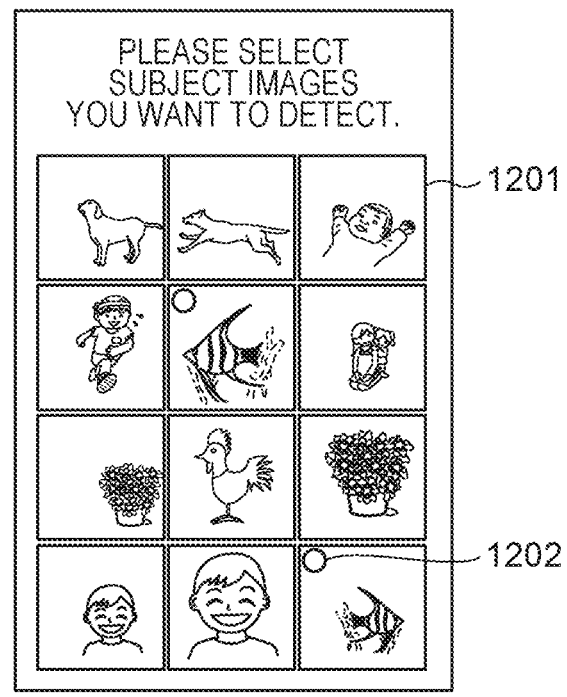
FIG. 12A is a diagram for describing an example of an input screen for teacher data and a network structure on a display unit 604 of the mobile terminal according to Example 1.

In step S1101 of FIG. 11, the user selects, via the operation unit 605, images to be used as teacher data from among the captured images stored in the recording unit 606. FIG. 12A is a diagram illustrating an example of an image selection screen on the display unit 604, which displays 12 captured images as indicated by a reference sign 1201. The user selects, for example, two teacher data from these 12 captured images by, for example, touching them with the operation unit 605. Suppose that the captured images with circles in the upper left corners thereof as indicated by a reference sign 1202 are images of the selected teacher data.

Figure 12B:
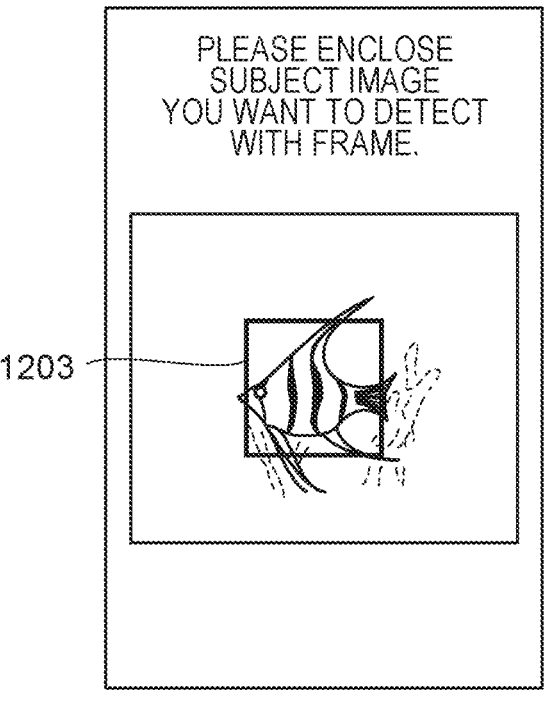
FIG. 12B is a diagram for describing the example of the input screen for the teacher data and the network structure on the display unit 604 of the mobile terminal according to Example 1.

In step S1102, the user specifies target subject regions in the two images selected as the teacher data via the operation unit 605. FIG. 12B is a diagram illustrating an example of an input screen for the subject region on the display unit 604, and a rectangular frame indicated by a reference sign 1203 indicates the subject region input by the user. For each image selected as the teacher data, the user sets a subject region. As a subject region setting method, regions may be directly selected from the images displayed through a touch panel, which is part of the operation unit 605 and is formed so as to be integrated with the display unit 604.

Alternatively, for example, regions may be selected from subject frames detected in a simplified manner by, for example, the CPU 601 using features, such as edges, and fine-tuned.

Figures 12C, 12D:
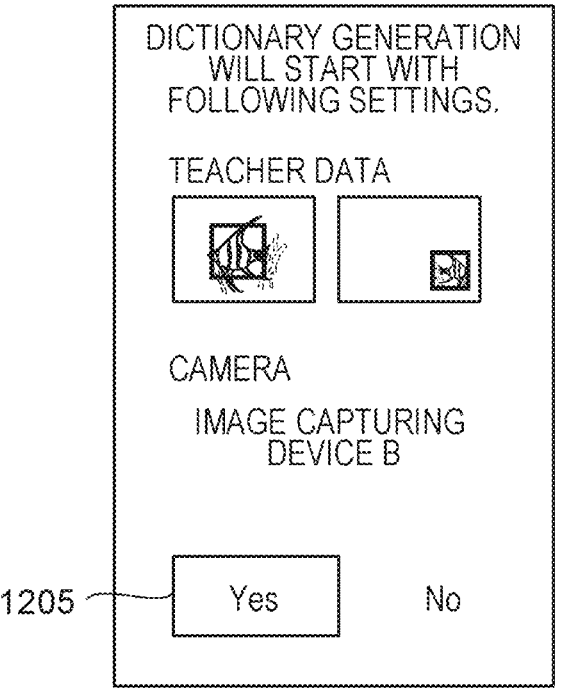
FIG. 12C is a diagram for describing the example of the input screen for the teacher data and the network structure on the display unit 604 of the mobile terminal according to Example 1.
FIG. 12D is a diagram for describing the example of the input screen for the teacher data and the network structure on the display unit 604 of the mobile terminal according to Example 1.

In step S1103, the user specifies network structure constraints (specifies network-structure-related information) via the operation unit 605. Specifically, for example, the type of image capturing device is selected. FIG. 12C is a diagram illustrating an example of an input screen for the network structure on the display unit 604, and several model names of image capturing devices are displayed. From these model names, the user selects the model name of one image capturing device for which the user wants to perform image capturing control using dictionary data. Suppose that the model name indicated by a reference sign 1204 is selected.

In step S1104, the user decides to start dictionary data generation via the operation panel 605. FIG. 12D is a diagram illustrating an example of a confirmation screen for starting dictionary data generation on the display unit 604, and YES or NO is to be input. In a case where YES indicated by a reference sign 1205 is selected, the teacher data and information regarding the type of image capturing device are transmitted to the server 110 via the communication unit 607, and the server 110 performs dictionary data generation. In a case where NO is selected in FIG. 12D, the process ends.

Note that the subject regions in the image data of the teacher data are treated as positive cases, and other regions are treated as negative cases in the dictionary data generation performed by the server 110. The above description illustrates an example of selecting images in which subject regions exist; however, it is also possible to select images in which subject regions do not exist. In such cases, information regarding subject regions is not input, and the entire images in which subject regions do not exit are treated as negative cases.

As described above, the image capturing system according to Example 1 can generate any dictionary data that is desired by the user and that can be used by the image capturing device.

Example 2

An image capturing system according to Example 2 of the present invention will be described in detail below. The description of substantially the same portions as in Example 1 will be omitted.

Figure 13:
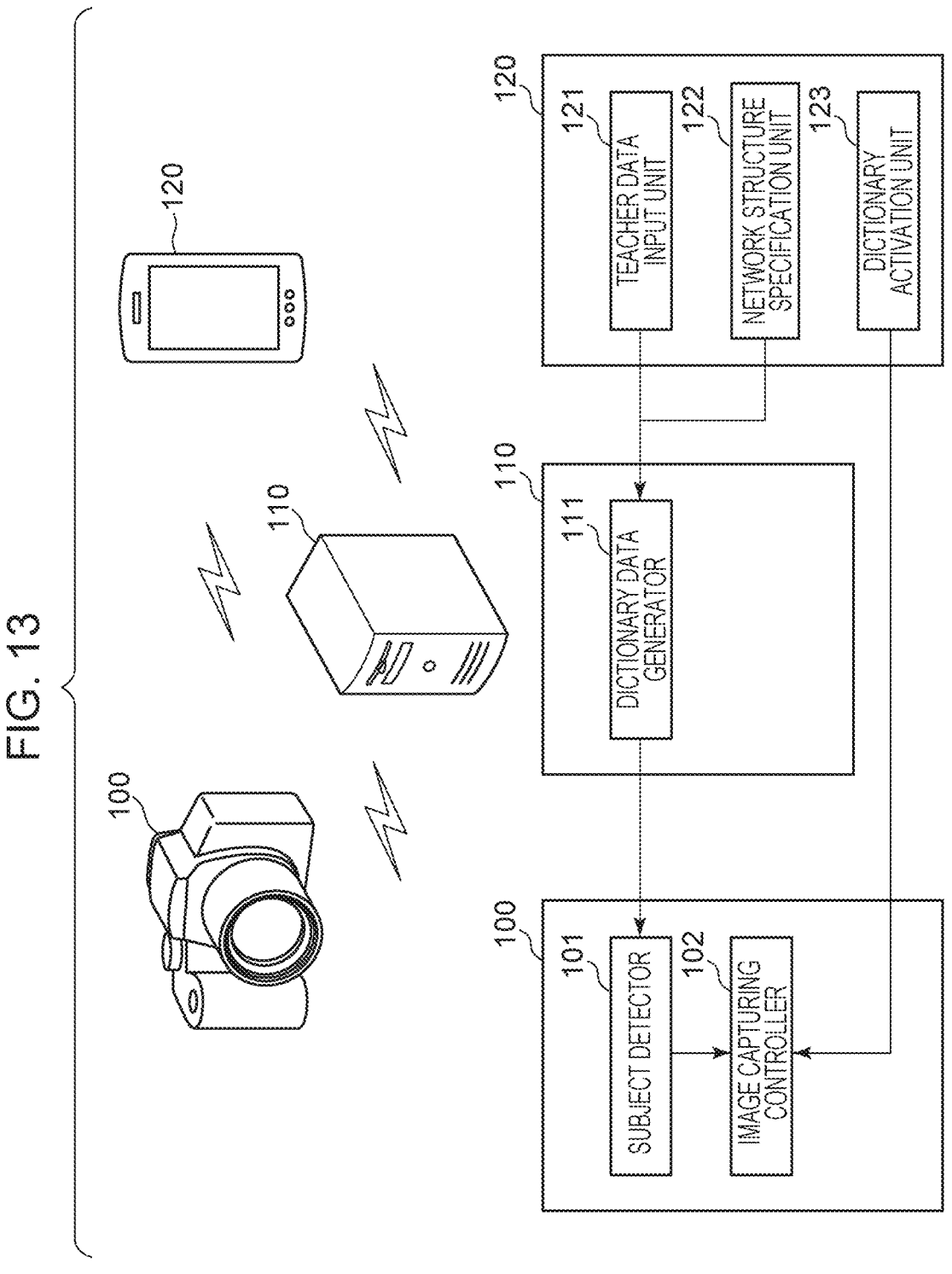
FIG. 13 is a diagram illustrating the configuration of an image capturing system according to Example 2.

FIG. 13 is a diagram illustrating an example of the configuration of an image capturing system according to Example 2. The image capturing system includes an image capturing device 100, a server 110 serving as an information processing server, and a mobile terminal 120 serving as an information input device. The image capturing device 100, the server 110, and the mobile terminal 120 are connected by, for example, a wireless communication network.

In Example 2, any (custom) dictionary data desired by the user for subject detection can also be generated using predetermined application software installed on the mobile terminal 120 in the same manner as in Example 1. However, in Example 2, the service that allows the user to generate custom dictionary data, which will be referred to as a "user custom dictionary", by making a payment can be activated on the image capturing device 100.

In this billing service, the value of the dictionary data cannot be determined without being able to confirm that the user custom dictionary matches the user's intentions.

Thus, the image capturing device 100 displays, with a frame, a detection result based on the user custom dictionary. This makes it possible to evaluate detection performance. The billing system is such that the purchase of the dictionary data enables the image capturing control function (makes the image capturing control function available) using the user custom dictionary in the image capturing device 100.

The mobile terminal 120 has a dictionary activation unit 123. In a case where the user custom dictionary is activated by making a payment through the mobile terminal 120, image capturing control based on subject detection results using the user custom dictionary is enabled on the image capturing device 100. In this case, the dictionary activation unit 123 functions as a dictionary activation means configured to activate, by means of a payment, the dictionary data generated by the dictionary generation means.

Figure 14:
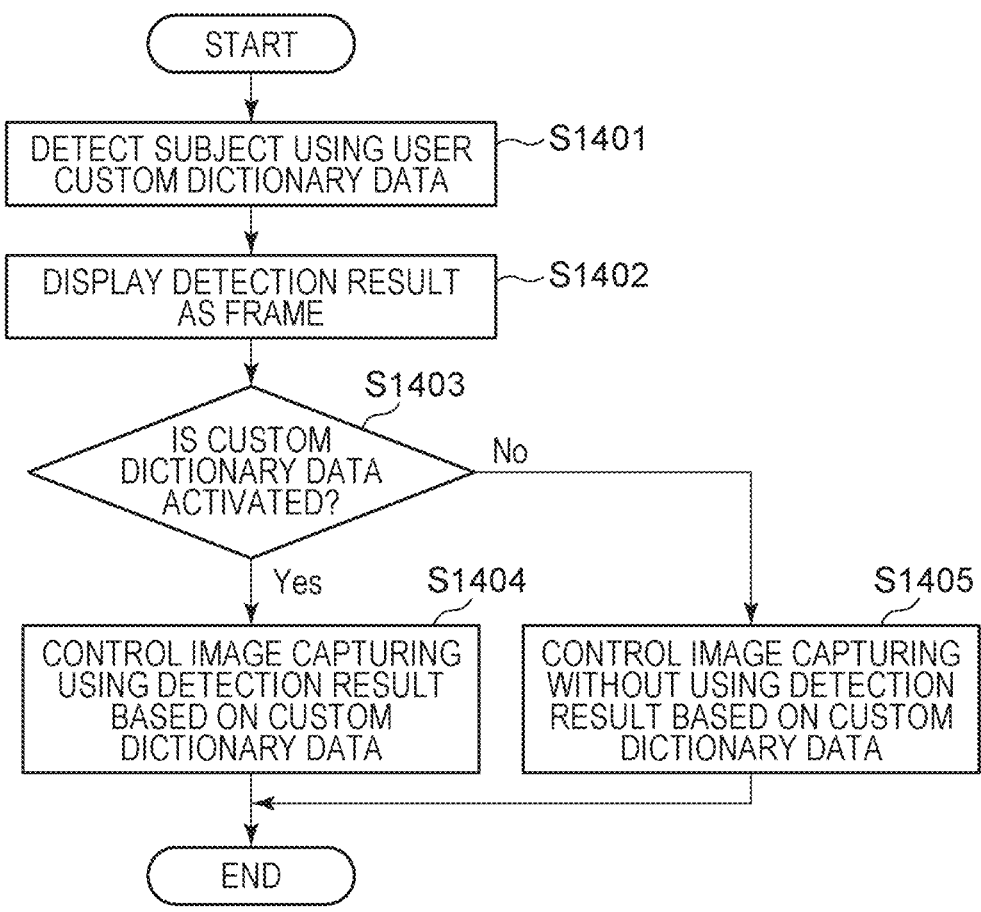
FIG. 14 is a flowchart illustrating an example of processing performed by an image capturing device according to Example 2.

FIG. 14 is a flowchart illustrating an example of processing performed by the image capturing device according to Example 2. FIG. 14 is used to describe the procedure of processing performed by the image capturing device 100 according to Example 2. The operation of this flowchart is realized by the CPU 201 reading out and executing a computer program loaded into the memory 202 from the non-volatile memory 203 in a state where the power of the image capturing device 100 is on, the computer program having been stored in the non-volatile memory 203.

In step S1401, the neural network processing unit 205 performs subject detection using a user custom dictionary. As described with FIG. 8B, suppose that the image capturing device 100 is set to use a custom dictionary.

In step S1402, the display controller 215 superimposes the subject detection result as a frame on an image captured by the image capturing device and displays the resulting image on the display unit 216 serving as a display means. This allows the user to confirm that the dictionary data for subject detection matches the user's intentions. In a case where the target subject is detected and a state where no subjects other than the target subject are detected, it can be evaluated that the dictionary data that match the user's intentions has been generated. In a case where the dictionary data for subject detection does not match the user's intentions, the user may add teacher data to regenerate dictionary data on the mobile terminal 12. In other words, a screen may be displayed in step S1402 to display subject detection results and to allow the user to select whether or not to proceed to the dictionary data regeneration procedure (FIG. 11).

In step S1403, the CPU 201 determines whether or not the user custom dictionary is active. The user custom dictionary is deactivated in the initial state and can be activated by the mobile terminal 120. In a case where the mobile terminal 120 performs processing for activating dictionary data by means of a payment via the operation unit 605, the image capturing device 100 is notified of this via the communication unit 607.

In a case where the user custom dictionary is active in step S1403, image capturing control is performed in step S1404 using detection results based on the dictionary data. In a case where the user custom dictionary is inactive in step S1403, image capturing control is performed in step S1405 without using detection results based on the dictionary data.

That is, in a case where the dictionary activation means has made the dictionary data active, the image capturing device 100 performs predetermined image capturing control (for example, AF, AE) based on the user custom dictionary data on a subject detected by performing subject detection. In a case where the dictionary activation means has not made the dictionary data active, the image capturing device 100 is controlled not to perform the predetermined image capturing control based on the user custom dictionary data.

Figure 15A:
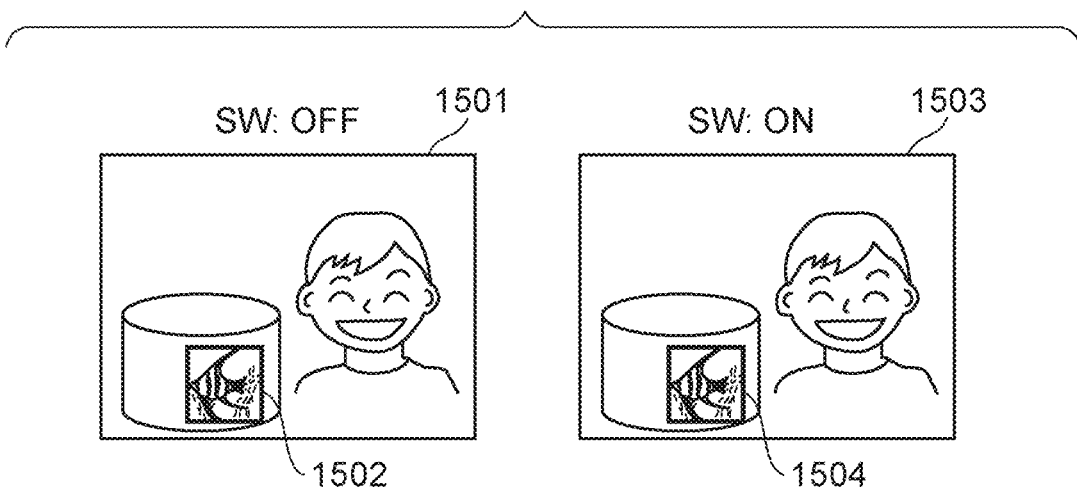
FIG. 15A includes diagrams for description regarding image capturing control before and after activation of a user custom dictionary.
Figure 15B:
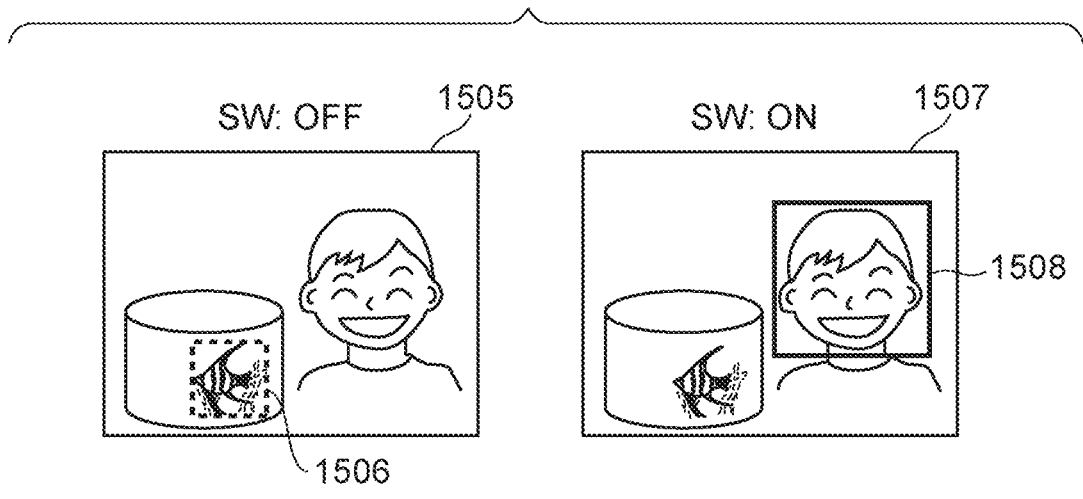
FIG. 15B includes diagrams for description regarding image capturing control before and after activation of the user custom dictionary.

FIGS. 15A and 15B are diagrams for describing image capturing control before and after the activation of the user custom dictionary. FIG. 15A illustrates an example of captured images on the display unit 216 after the activation of the user custom dictionary. A captured image 1501 is displayed such that a subject detection result 1502 based on the user custom dictionary is superposed as a frame on a captured image from the image capturing device 100 with its still image recording switch turned off. A captured image 1503 illustrates a state where the still image recording switch of the image capturing device 100 is turned on and the image capturing control, such as autofocus and exposure control, is being performed on the basis of a subject detection result 1504 based on the user custom dictionary.

FIG. 15B illustrates an example of captured images on the display unit 216 before the activation of the user custom dictionary. A captured image 1505 is displayed such that a subject detection result 1506 based on the user custom dictionary is superposed as a frame on a captured image from the image capturing device 100 with its still image recording switch turned off. In this case, the subject detection result 1502 in FIG. 15A is indicated by a solid line, while the subject detection result 1506 is indicated by a dotted line. This is to make it easier for the user to confirm that the user custom dictionary has not yet been activated (inactive). Such changes made are not limited to solid and dotted lines, and the shape and color of the frame may be changed.

A captured image 1507 illustrates a state where the still image recording switch of the image capturing device 100 is turned on and the image capturing control, such as autofocus and exposure control, is being performed on the basis of a subject detection result 1508 based on a dictionary different from the user custom dictionary. In the captured image 1507, the dictionary data for faces corresponding to "person", which is different from the user custom dictionary, is used, and the subject detection result 1508 is superposed as a frame on the face of a person.

The case of one type of user custom dictionary has been described above, but it is not limited to one type, and multiple types may be set. In that case, for each user custom dictionary, activation-deactivation processing is applied by means of a payment. That is, in a case where there are multiple dictionary data generated by the dictionary generation means, the dictionary activation means activates each dictionary data by means of a payment.

The example has been described above in which billing is applied to the activation-deactivation of the user custom dictionary, but the service is also applicable to ready-made dictionary data registered in each device or server in advance and generated by the service provider, as a service for adding a dictionary by making a payment. That is, regarding the ready-made dictionaries prestored in the memory of each device or on the server 110, the setting of activation and deactivation may also be made possible by the dictionary activation means.

As described above, with the image capturing system according to Example 2, the purchase decision for the acquired dictionary data can be made after confirming the subject detection performance of the acquired dictionary data on the image capturing device 100. In addition, since whether or not the subject detection performance of the dictionary data is sufficient can be confirmed, it is possible to provide teacher data additionally and further improve the subject detection performance of the generated dictionary.

Example 3

An image capturing system according to Example 3 of the present invention will be described in detail below. The description of substantially the same portions as in Example 1 will be omitted.

Figure 16:
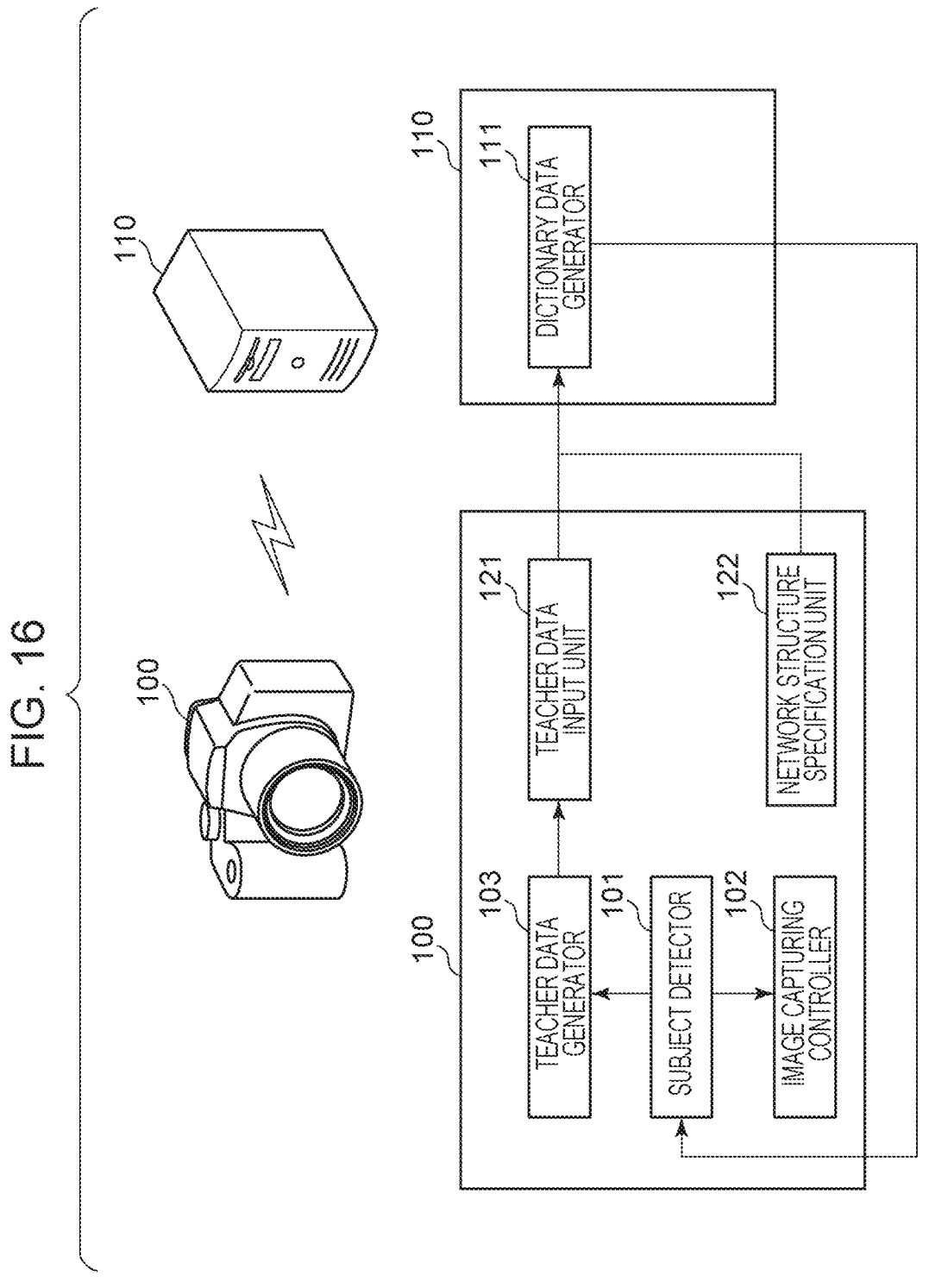
FIG. 16 is a diagram of the configuration of an image capturing system according to Example 3.

FIG. 16 is a diagram of the configuration of the image capturing system according to Example 3. The image capturing system according to Example 3 includes an image capturing device 100, and a server 110 serving as an information processing server. The image capturing device 100 and the server 110 are connected by a wireless communication network. The difference from Example 1 is that there is no mobile terminal 120 as an information processing terminal, and the image capturing device 100 takes the role of inputting teacher data and a network structure.

In the image capturing system according to Example 1, any dictionary data desired by the user can be generated. However, the user needs to generate teacher data, and this requires certain effort. To eliminate this effort, Example 3 illustrates a configuration for assisting in the generation of teacher data. That is, in the image capturing system according to Example 3, the image capturing device 100 includes a teacher data generator 103 serving as a teacher data generation means, and the user inputs teacher data using the teacher data input unit 121 on the basis of the results from the teacher data generator 103.

The teacher data generator 103 uses inference results from the subject detector 101 (the neural network processing unit 205). The processing in the subject detector 101 (the neural network processing unit 205) differs between a case where processing is performed for image capturing control when image capturing is performed and a case where processing is performed for teacher data generation when image capturing is not performed. Details will be described below.

In the image capturing system according to Example 1, the network structure specification unit 122 is included in the mobile terminal 120, which is different from the image capturing device, and is configured to allow the user to specify the model name of the image capturing device since the network structure constraints vary depending on the model of the image capturing device. In contrast, in the image capturing system according to Example 3, the network structure specification unit 122 is included in the image capturing device 100, and not the user but the CPU 201 of the image capturing device 100 specifies a network structure and notifies the server 110 of the network structure via the communication unit 218.

Note that some of the functional blocks illustrated in FIG. 16 are realized by causing the CPU 201, which serves as the computer included in the image capturing device 100, to execute a computer program stored in, for example, the non-volatile memory 203 as a storage medium. However, some or all of the functional blocks may be realized using hardware. The hardware can be a dedicated circuit (an ASIC) or a processor (a reconfigurable processor, a DSP).

Figure 17A:
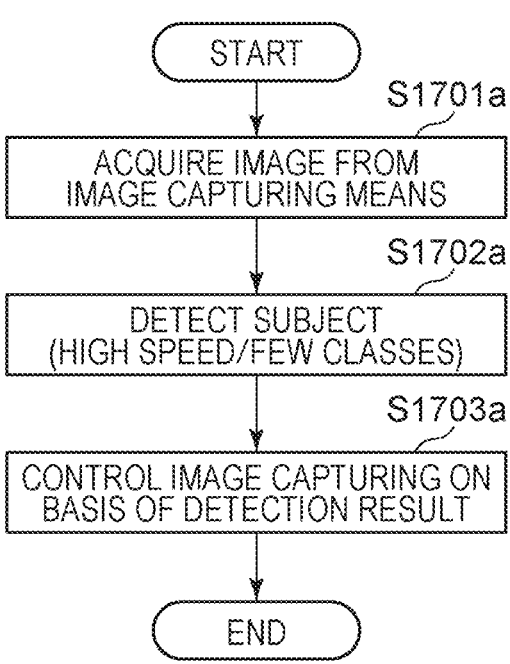
FIG. 17A is a flowchart for describing processing performed by an image capturing device 100 according to Example 3.
Figure 17B:
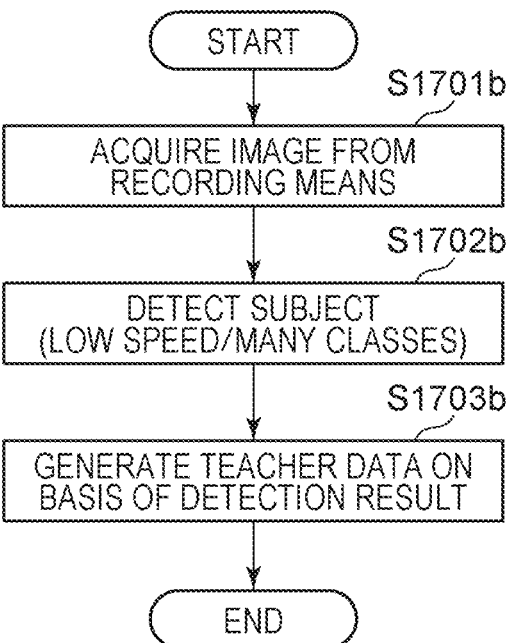
FIG. 17B is a flowchart for describing processing performed by the image capturing device 100 according to Example 3.

FIGS. 17A and 17B are flowcharts for describing processing performed by the image capturing device 100 according to Example 3. FIGS. 17A and 17B are used to describe the procedure of processing, focusing on the differences between neural network processing for image capturing control performed when the image capturing device 100 according to Example 3 performs image capturing and neural network processing for teacher data generation performed when the image capturing device 100 does not perform image capturing. FIG. 17A is a flowchart illustrating the procedure of processing performed when image capturing is performed, and FIG. 17B is a flowchart illustrating the procedure of processing performed when image capturing is not performed.

These operations are realized by the CPU 201 reading out and executing a computer program loaded into the memory 202 from the non-volatile memory 203 in a state where the power of the image capturing device 100 is on, the computer program having been stored in the non-volatile memory 203. The same is true for the flowchart in FIG. 18 below.

In the processing performed when image capturing is performed in FIG. 17A, an image is acquired from the image capturing means in step S1701*a*. Using the image, the subject detector 101 (the neural network processing unit 205) performs subject detection in step S1702*a*. Based on this detection result, the image capturing controller 102 performs image capturing control in step S1703*a*. Since the subject detection result is used in image capturing control, such as autofocus, the subject detector 101 (the neural network processing unit 205) needs to process the subject detection at high speed.

For high-speed processing, the types of subjects to be detected are limited. For example, as described using FIGS. 8A and 8B, the subject to be detected is selected in the menu settings, and dictionary data for detecting only the selected subject is used. By specifying the subject to be detected, fewer parameters are needed to express the characteristics of the subject, and the number of sum-of-products operations for feature extraction is reduced, thereby enabling high-speed processing.

In contrast, in the processing performed when image capturing is not performed in FIG. 17B, an image is acquired from, for example, the recording medium 220 serving as a recording means or a server in step S1701*b*. Using the image, the subject detector 101 (the neural network processing unit 205) performs subject detection in step S1702*b*. On the basis of this detection result, teacher data is generated in step S1703*b*.

Since the purpose of step S1703*b* is to generate any teacher data desired by the user, it is necessary to detect a wide variety of subjects in subject detection performed by the subject detector 101 (the neural network processing unit 205). In order to detect a wide variety of subjects, it is necessary to increase the number of parameters that represent subject characteristics, and this increases the number of sum-of-products operations for feature extraction. Therefore, the processing will be slow.

Figure 18:
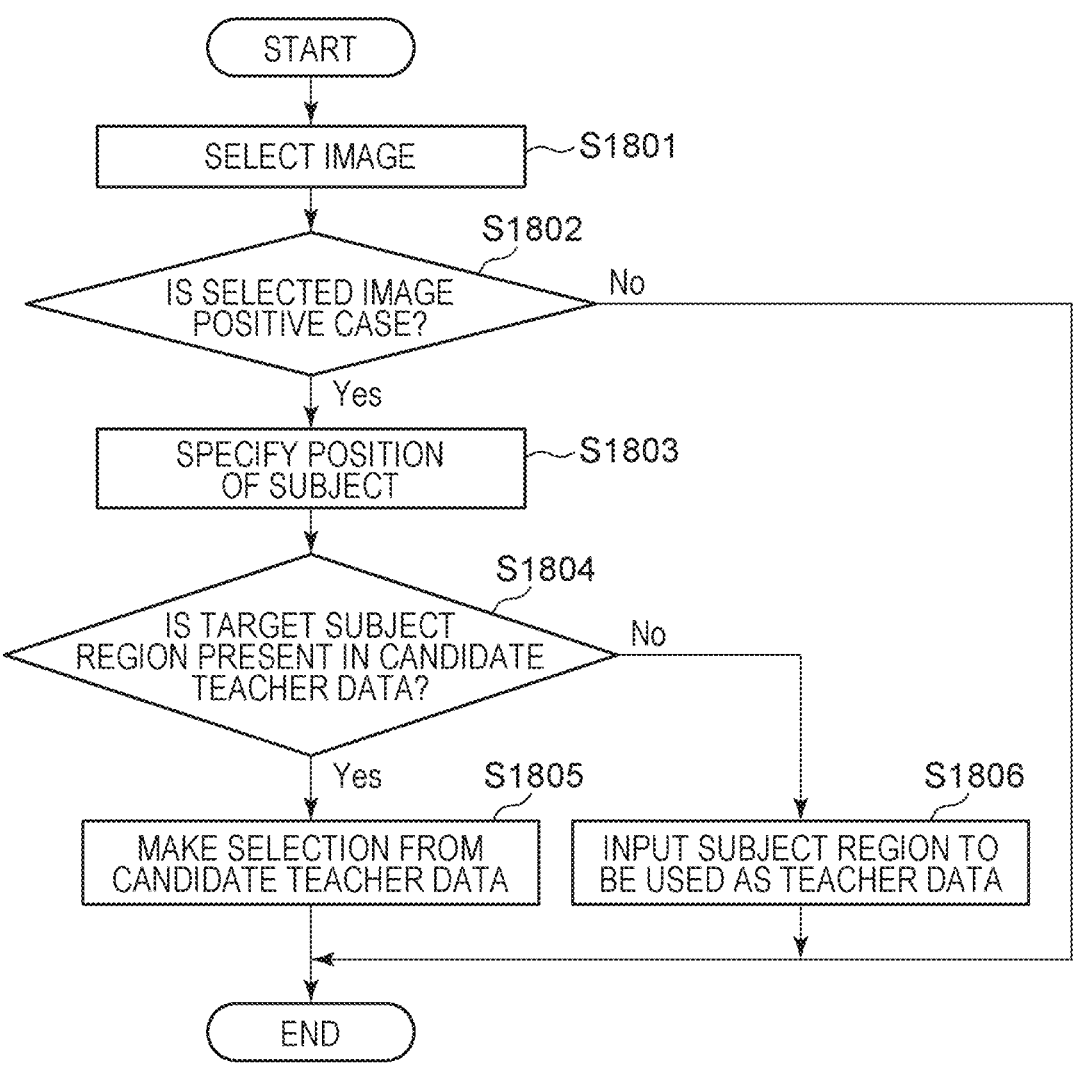
FIG. 18 is a flowchart for describing the procedure of teacher data input processing in FIG. 17B.
Figure 19A:
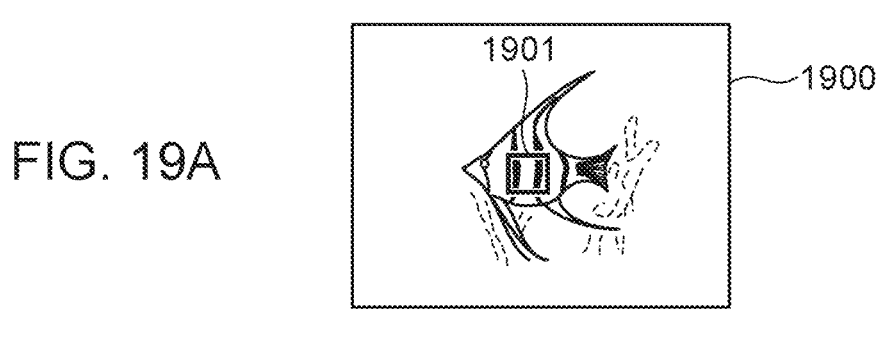
FIG. 19A is a diagram illustrating an example of a teacher data input screen in FIG. 18.
Figure 19B:
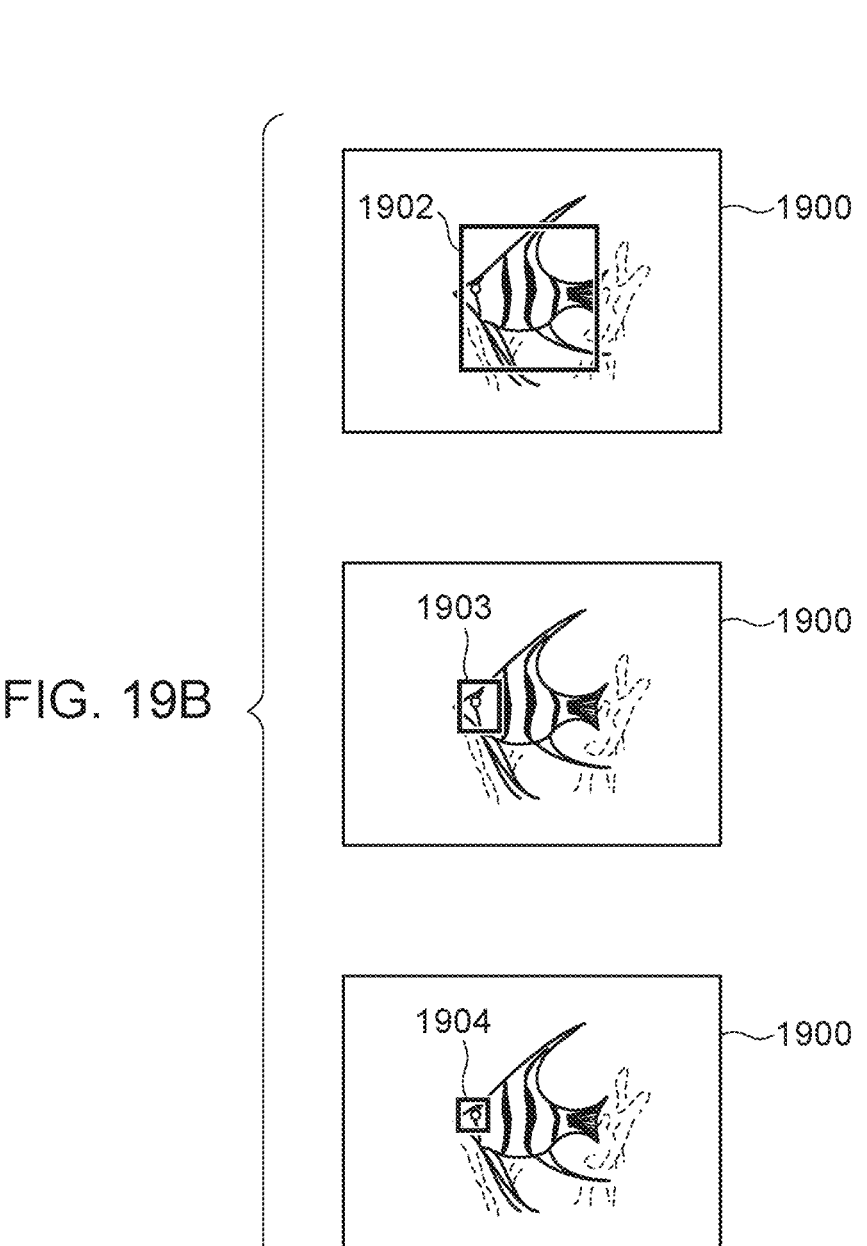
FIG. 19B includes diagrams illustrating examples of candidate teacher data.

FIG. 18 is a flowchart for describing the procedure of teacher data input processing in FIG. 17B. FIGS. 19A and 19B are diagrams illustrating an example of a teacher data input screen in FIG. 18.

Teacher data is input by the user via the operation unit 204 on the basis of the information displayed on the screen 1900 (FIG. 19A, FIG. 19B) of the display unit 216 of the image capturing device 100.

In step S1801, the user selects an image that the user wants to use as teacher data from the captured images recorded on the recording medium 220.

In step S1802, the user selects whether the selected image is a positive or negative case. In a case where a target subject is present in the selected image, the user selects a positive case, and the process proceeds to step S1803. In contrast, in a case where a target subject is absent in the selected image, the user selects a negative case, and the process ends. In this case, the entire image in which the target subject is absent is treated as a negative case region. For example, the image is used to select subjects that the user does not want to detect.

In step S1803, the position of the target subject is specified in the selected image. For example, in a case where the operation unit 204 is a touch panel, the user can specify the position of the target subject by touching the touch panel. The focus region at the time of image capturing may be used as the initial value for the position of the target subject. In FIG. 19A, a reference sign 1900 denotes the selected image, and a reference sign 1901 denotes an example of the specified position.

In step S1804, candidate teacher data is displayed on the screen 1900 of the display unit 216 to confirm whether the region of the target subject is present. On the basis of the subject detection result from the neural network processing unit 205, the subject region close to the specified position is treated as candidate teacher data. FIG. 19B illustrates examples of candidate teacher data. The examples illustrate the same subject but illustrate three examples of candidate teacher data having different regions. As candidate teacher data, the reference sign 1902 denotes the whole body, a reference sign 1903 denotes the face, and a reference sign 1904 denotes the eye.

In a case where a target subject region is present in the candidate teacher data in step S1804, the process proceeds to step S1805, and one of the candidate teacher data is treated as a positive region of the teacher data. In a case where a target subject region is absent in the candidate teacher data in step S1804, the process proceeds to step S1806, and the user inputs a subject region to be used as teacher data.

As described above, the image capturing system according to Example 3 allows the image capturing device 100 itself to generate teacher data and also reduces the burden on the user for generating teacher data.

In Example described above, the case of a single user custom dictionary data has been described. However, the number of user custom dictionary data is not limited to this. Multiple dictionary data may be generated, and the image capturing device 100 may be configured to be capable of receiving the multiple dictionary data. In this case, certain information is needed to distinguish and classify each dictionary data. Therefore, suppose that in addition to the computer program and learned coefficient parameters, information identifying (representing) the dictionary is added as header information to the dictionary data that is recorded in the recording unit 506 and to be transmitted to the image capturing device 100. The header information includes, for example, the name of the dictionary data, the type (classification) of the subject to be detected, the creation date and update date of the dictionary data, the name of the creator of the dictionary data, the number of teacher data used to generate the dictionary data (positive and negative cases may be or do not have to be distinguished), and current version information. In addition, the teacher data itself used as effective information in identifying or evaluating the dictionary data in learning may be assigned. Alternatively, the teacher data may be stored on the server 110, and the dictionary data may store the address of the corresponding teacher data in the server 110. With these pieces of information, it is possible to confirm what kind of teacher data was used for each dictionary data. When attaching the teacher data to the dictionary data, the amount of data becomes large when the number of teacher data is large. Thus, the maximum number of attachable teacher data may be set to attach some of the teacher data. The teacher data to be attached may be specified by the user or selected by the CPU 501 of the server 110 on the basis of a certain evaluation value.

Figure 20:
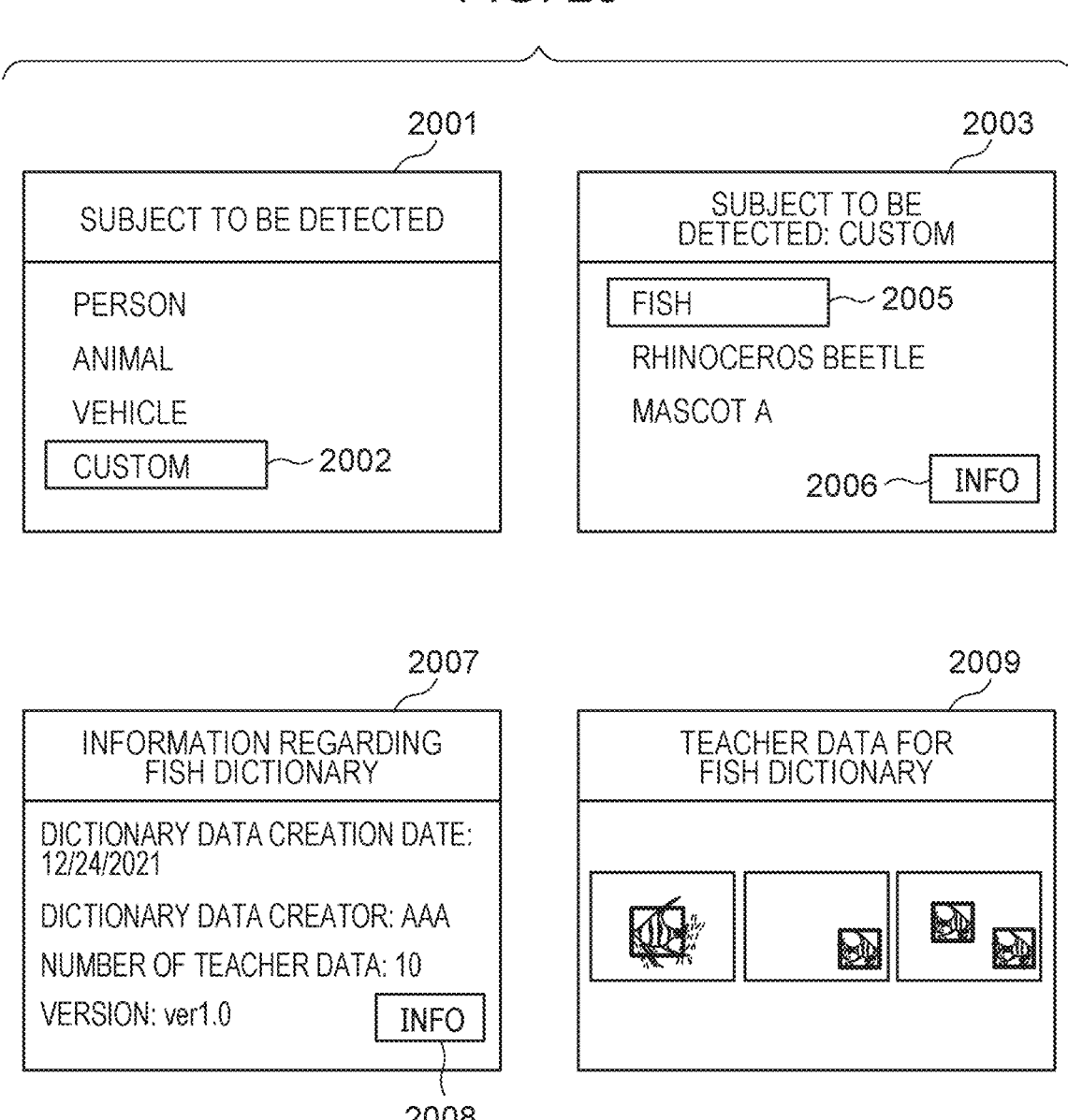
FIG. 20 includes diagrams for describing an example of dictionary data information confirmation performed by the image capturing device 100.

FIG. 20 illustrates examples of a dictionary data confirmation screen on the image capturing device 100. Menus 2001, 2003, 2007, and 2009 in FIG. 20 illustrate examples of menu screens that the CPU 201 causes the display unit 216 to display at the time of confirmation of the content of the dictionary data. The menu 2001 is a menu screen where the user sets, via the operation unit 204, a subject to be detected, and "custom" 2002 is set. In a case where there are multiple custom dictionary data received from the server 110, the screen transitions to the menu 2003 to select custom dictionary data. The menu 2003 illustrates a state where "fish", "rhinoceros beetle", and "mascot A" are received as custom dictionary data by the image capturing device 100. The names of the dictionary data, "fish, "rhinoceros beetle", and "mascot A", are stored in the header information of the dictionary data. These names are set by the user on the mobile terminal 120 via the operation unit 605 when setting up the teacher data. On the menu 2003, "fish" 2005 is selected as the dictionary data, and the "fish" dictionary data is used for subject detection. In this case, when "INFO" 2006 is selected via the operation unit 204, the screen transitions to the menu screen 2007, which displays the header information of "fish". The menu 2007 illustrates an example of displaying the creation date of the dictionary data, the creator of the dictionary data, the number of teacher data, and the version of the dictionary, which are stored as the header information of the "fish" dictionary data. As the creation date of the dictionary data, the date when the server 110 created the dictionary is stored in the header information of the dictionary data. As the creator of the dictionary data, the owner information on the mobile terminal 120 is stored in the header information of the dictionary data. The number of teacher data is based on the number of images at the time of setting up the teacher data, and this is stored in the dictionary data. Regarding these pieces of header information stored in the header region, the user may directly input numerical values and names at the time of setting up (receiving) the teacher data.

The dictionary data may have a configuration that can be updated even after the dictionary data has been generated once. For example, the current learned coefficient parameters can be used as initial values, and new teacher data can be added to perform learning again. The version on the menu 2007 indicates its update information and is assigned by the server each time learning is performed again. Although these pieces of header information make it possible to grasp the overview of the dictionary data, it is difficult to grasp details such as what subjects are likely to be detected. The best way to grasp the characteristics of subject detection is to check the teacher data itself. When "INFO" 2008 is selected via the operation unit 204, the screen will transition to the menu

2009, which illustrates the teacher data of the "fish" dictionary data. The addresses of the teacher data stored in the server 110 are stored in the dictionary data, and the CPU 201 causes the display unit 216 to display the teacher data via the communication unit 218 in the present embodiment. In this case, not only information as to whether this is a positive or negative case and frame information indicating the corresponding region of the subject but also at least some of the teacher data as described above may accompany the dictionary data and be received and recorded. In this case, the CPU 201 causes the display unit 216 to display the teacher data corresponding to the dictionary data, the teacher data being recorded together with the dictionary data on the recording medium 220 or memory 202.

As described above, even when there are multiple custom dictionary data, the user can confirm the differences between the dictionary data. In the description above, the image capturing device 100 allows confirmation of the information regarding the dictionary data; however, the mobile terminal 120 may be configured to allow confirmation of the information regarding the dictionary data. In this case, suppose that the types of image capturing devices indicating the network structure constraints set at the time when the teacher data was input are additionally stored, as the header information of the dictionary data, in the dictionary data and are displayed on the display unit 604.

In the present embodiment, Examples have been illustrated in which the mobile terminal 120 generates and supplies the teacher data for generating the dictionary data and the device used for receiving the dictionary data and performing subject detection processing is a separate device from the image capturing device 100; however, the present embodiment is not limited to this example. Both devices may be configured as a single device.

OTHER EMBODIMENTS

In the description above, the present invention has been described in detail on the basis of appropriate Examples. However, the present invention is not limited to Examples described above, and various modifications are possible based on the gist of the present invention, which are not excluded from the scope of the present invention.

The targets to which the present invention may be applied are not limited to the image capturing device 100, server 110, mobile terminal 120, and so forth described in Examples described above. For example, even in a case where the image capturing device 100 is a system formed by multiple devices, it is possible to achieve substantially the same functions as in Examples described above. Furthermore, part of the processing performed by the image capturing device 100 can be realized by causing an external device on the network to perform the part of the processing.

Note that a computer program that realizes the functions of Examples described above corresponding to all or part of the control performed in Examples may be supplied to, for example, the image capturing system via a network or various storage media. A computer (or a CPU, an MPU, or the like) in, for example, the image capturing system may then read out and execute the program. In that case, the program and the storage medium storing the program will be encompassed by the present invention.

According to the present invention, an image capturing system that can generate any dictionary data desired by the user can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing system configured to perform subject detection based on a neural network, comprising:
   a teacher data input unit configured to input teacher data for the subject detection;
   a network structure specification unit configured to specify information regarding the network structure for the subject detection;
   a dictionary generation unit configured to generate dictionary data for the subject detection based on the teacher data and the information regarding the network structure; and
   an image capturing device configured to perform the subject detection based on the dictionary data generated by the dictionary generation unit and perform predetermined image capturing control on a subject detected by performing the subject detection,
   wherein the dictionary data includes, as header information, information regarding a count of teacher data used to generate the dictionary data.

2. The image capturing system according to claim 1, wherein the image capturing device includes a communication unit configured to receive the dictionary data, and performs the subject detection based on the dictionary data received by the communication unit.

3. The image capturing system according to claim 1, wherein the information regarding the network structure includes information regarding at least one of an image size of input data, a channel count of the input data, a network parameter count, memory capacity, a layer type, an activation function type, and a sum-of-products specification.

4. The image capturing system according to any claim 1, wherein the header information includes information regarding at least one of a creation date, a creator, an update date, and a version of the dictionary data.

5. The image capturing system according to claim 4, further comprising: a display unit configured to display at least part of the header information on a display unit.

6. The image capturing system according to claim 1, wherein the teacher data includes image data and information regarding a subject region included as a positive or negative case in the image data.

7. The image capturing system according to claim 6, further comprising: a display unit configured to display the teacher data on a display unit.

8. The image capturing system according to claim 1, wherein the dictionary generation unit is provided in an information processing server different from the image capturing device.

9. The image capturing system according to claim 8, wherein the information processing server includes
   a teacher data acquisition unit configured to acquire the teacher data for the subject detection,
   a network structure acquisition unit configured to acquire the information regarding the network structure,
   the dictionary generation unit, and
   a dictionary data transmission unit configured to transmit the dictionary data generated by the dictionary generation unit to the image capturing device.

10. The image capturing system according to claim 1, wherein the dictionary generation unit selects a dictionary suitable for a subject of the teacher data from a plurality of the dictionary data prepared in advance.

11. The image capturing system according to claim 1, wherein the dictionary generation unit generates the dictionary data by performing learning based on the teacher data.

12. The image capturing system according to claim 1, wherein the teacher data input unit and the network structure specification unit are provided in an information processing terminal different from the image capturing device.

13. The image capturing system according to claim 1, wherein the teacher data includes image data and region information regarding the image data in which a target subject is present.

14. The image capturing system according to claim 1, wherein the network structure specification unit specifies the network structure by specifying a model of the image capturing device.

15. The image capturing system according to claim 1, further comprising: a dictionary activation unit configured to activate the dictionary data generated by the dictionary generation unit, wherein
   in a case where the dictionary data has been activated by the dictionary activation unit, the image capturing device performs the predetermined image capturing control on the subject detected by performing the subject detection, and
   in a case where the dictionary data has not been activated by the dictionary activation unit, the image capturing device does not perform the predetermined image capturing control.

16. The image capturing system according to claim 1, further comprising: a display unit configured to display a result of the subject detection as a frame superposed on an image from the image capturing device.

17. The image capturing system according to claim 1, wherein the dictionary activation unit activates the dictionary data by unit of a payment.

18. The image capturing system according to claim 1, wherein in a case where there are a plurality of the dictionary data generated by the dictionary generating unit, the dictionary activation unit activates each of the dictionary data by unit of a payment.

19. The image capturing system according to claim 1, wherein the image capturing device includes a teacher data generation unit configured to generate the teacher data.

20. An image capturing device configured to perform subject detection based on a neural network, comprising:
   a teacher data input unit configured to input teacher data for the subject detection;
   a network structure specification unit configured to specify information regarding the network structure for the subject detection;
   a communication unit configured to transmit the teacher data and the information regarding the network structure to an information processing server; and
   an image capturing control unit configured to acquire, from the information processing server via the communication unit, dictionary data for the subject detection generated based on the teacher data and the information regarding the network structure in the information processing server, perform the subject detection based on the dictionary data, and perform predetermined image capturing control on a subject detected by performing the subject detection,
   wherein the dictionary data includes, as header information, information regarding a count of teacher data used to generate the dictionary data.

21. The image capturing device according to claim 20, wherein the information regarding the network structure includes information regarding at least one of an image size of input data, a channel count of the input data, a network parameter count, memory capacity, a layer type, an activation function type, and a sum-of-products specification.

22. The image capturing device according to claim 20, further comprising: a display unit configured to display a result of the subject detection as a frame superposed on an image.

23. The image capturing device according to claim 20, wherein the header information includes information regarding at least one of a creation date, a creator, an update date, and a version of the dictionary data.

24. An information processing server comprising: a teacher data acquisition unit configured to acquire teacher data for subject detection;

a network structure acquisition unit configured to acquire information regarding a network structure of an image capturing device;

a dictionary generation unit configured to generate dictionary data for subject detection based on the teacher data and the information regarding the network structure; and a dictionary data transmission unit configured to transmit the dictionary data generated by the dictionary generation unit to the image capturing device, wherein the dictionary data includes, as header information, information regarding a count of teacher data used to generate the dictionary data.

25. The information processing server according to claim 24, wherein the dictionary generation unit selects a dictionary suitable for a subject of the teacher data from a plurality of the dictionary data prepared in advance.

26. The information processing server according to claim 24, wherein the dictionary generation unit generates the dictionary data by performing learning based on the teacher data.

27. The information processing server according to claim 24, wherein the teacher data and the information regarding the network structure are acquired from the image capturing device or an information processing terminal different from the image capturing device.

28. The information processing server according to claim 24, wherein the information regarding the network structure includes information regarding at least one of an image size of input data, a channel count of the input data, a network parameter count, memory capacity, a layer type, an activation function type, a sum-of-products specification, and a model of the image capturing device.

29. An image capturing method for performing subject detection based on a neural network, comprising:

inputting teacher data for the subject detection;

specifying information regarding the network structure for the subject detection;

generating dictionary data for the subject detection based on the teacher data and a constraint on the network structure;

performing the subject detection based on the dictionary data generated in the generating; and performing predetermined image capturing control on a subject detected by performing the subject detection, wherein the dictionary data includes, as header information, information regarding a count of teacher data used to generate the dictionary data.

30. An image capturing method for performing subject detection based on a neural network, comprising:

inputting teacher data for the subject detection;

specifying information regarding the network structure for the subject detection;

transmitting the teacher data and the information regarding the network structure to an information processing server;

acquiring, from the information processing server, dictionary data for the subject detection generated based on the teacher data and the information regarding the network structure in the information processing server; performing the subject detection based on the dictionary data; and performing predetermined image capturing control on a subject detected by performing the subject detection, wherein the dictionary data includes, as header information, information regarding a count of teacher data used to generate the dictionary data.

31. An information processing method comprising:

acquiring teacher data for subject detection;

acquiring information regarding a network structure of an image capturing device;

generating dictionary data for subject detection based on the teacher data and the information regarding the network structure; and transmitting the dictionary data generated in the generating to the image capturing device, wherein the dictionary data includes, as header information, information regarding a count of teacher data used to generate the dictionary data.

* * * * *